US011966704B1

(12) United States Patent
Magary et al.

(10) Patent No.: US 11,966,704 B1
(45) Date of Patent: Apr. 23, 2024

(54) TECHNIQUES FOR VERIFYING A VERACITY OF MACHINE LEARNING OUTPUTS

(71) Applicant: AMKS Investments I LLC, Contoocook, NH (US)

(72) Inventors: Alexander C. Magary, Contoocook, NH (US); Kareem Serageldin, London (GB)

(73) Assignee: AMKS Investments I LLC, Contoocook, NH (US)

( * ) Notice: Subject to any disclaimer, the term of this patent is extended or adjusted under 35 U.S.C. 154(b) by 0 days.

(21) Appl. No.: 18/486,023

(22) Filed: Oct. 12, 2023

(51) Int. Cl.
 *G06F 17/00* (2019.01)
 *G06F 40/30* (2020.01)
(52) U.S. Cl.
 CPC .................. *G06F 40/30* (2020.01)
(58) Field of Classification Search
 None
 See application file for complete search history.

(56) References Cited

U.S. PATENT DOCUMENTS

| | | | | |
|---|---|---|---|---|
| 10,303,758 | B2* | 5/2019 | Ben Ami | G06N 3/08 |
| 10,997,606 | B1* | 5/2021 | Coman | G06Q 30/016 |
| 11,113,175 | B1* | 9/2021 | Adamo | G06F 40/216 |
| 11,297,179 | B2* | 4/2022 | Birch | H04W 8/20 |
| 2016/0132800 | A1* | 5/2016 | Davar | G06Q 10/0637 |
| | | | | 705/7.36 |
| 2019/0272316 | A1* | 9/2019 | Ben Ami | G06F 40/30 |
| 2021/0125612 | A1* | 4/2021 | Coman | G06N 5/025 |
| 2021/0233090 | A1* | 7/2021 | Coman | G06F 40/35 |

OTHER PUBLICATIONS

[No Author Listed], The Role of TF-IDF in Modern Search Engine Optimization Strategies. marketbrew.ai htts://marketbrew.ai/the-role-of-tf-idf-in-modern-search-engine-optimization-strategies. Last accessed Dec. 31, 2023. 34 pages.
[No Author Listed], What is a Rest API? RedHat. https://www.redhat.com/en/topics/api/what-is-a-rest-api May 8, 2020. 7 pages.
Baeza-Yates et al., Modern Information Retrieval. ACM Press. 1999. 38 pages.

(Continued)

*Primary Examiner* — Satwant K Singh
(74) *Attorney, Agent, or Firm* — Wolf, Greenfield & Sacks, P.C.

(57) ABSTRACT

The techniques described herein relate to techniques for verifying a veracity of machine learning outputs. An example method includes receiving a first output generated by a first model responsive to a first input, the first output comprising one or more verifiable statements in text, verifying, using a second model and first reference data stored in at least one first datastore, the one or more verifiable statements to produce first verification results indicating which of them has been verified, when it is determined that at least one of them remains unverified based on the first verification results, identifying, using at least one of the first or second models, at least one second datastore having second reference data attesting to veracity of the first output; and verifying, using the second model and the second reference data, the at least one unverified statement to produce second verification results to be provided as output.

54 Claims, 8 Drawing Sheets

(56) References Cited

OTHER PUBLICATIONS

Brin et al., The anatomy of large-scale hypertextual web search engine. Computer Networks. 1998;30:107-17.
Buitinck et al., API Design for machine learning software: experiences from the scikit-learn project. arXiv:1309.0238v1 [cs.LG]. Sep. 1, 2013. 15 pages.
Charniak, Statistical Parsing with a Context-free Grammar and Word Statistics. AAAI'97/IAAI'97. 1997. 6 pages.
Chen et al., A Fast and Accurate Dependency Parser using Neural Networks. Proceedings of the 2014 Conference on Empirical Methods in Natural Language Processing (EMNLP). 2014; 740-50.
Dominguez-Sal et al., Cache-aware load balancing vs. cooperative caching for distributed search engines. 2009 11$^{th}$ IEEE International Conference on High Performance Computing and Communications. 2009;415-23.
Hogenhout et al., Robust Parsing Using a Hidden Markov Model. In Finite State Methods in Natural Language Processing. 1998:37-47.
Knuth et al., Fast Pattern Matching in Strings. SIAM Journal on Computing. 1977;6(2):323-50.
Kumar, Hidden Markov Models: Concepts, Examples. Analytics Yogi. https://vitalflux.com/hidden-markoy-models-concepts-explained-with-examples/ Jan. 27, 2023. 7 pages.
Li et al., Large Language Models as Counterfactual Generator: Strengths and Weaknesses. arXiv:2305.14791v1 [cs.CL]. May 24, 2023. 20 pages.
Liu et al., Neural Machine Reading Comprehension: Methods and Trends. arXiv: 1907.01118v5 [cs.CL]. Oct. 30, 2019. 46 pages.
Long et al., Three-Level Caching for Efficient Query Processing in Large Web Search Engines. WWW '05: Proceedings of the 14th international conference on World Wide Web. May 10, 2005. 10 pages.
Lopez Garcia et al., DEEPaaS API: a REST API for Machine Learning and Deep Learning models. Journal of Open Source Software. 2019;4(42):1517.2 pages.
Madaan et al., Generate Your Counterfactuals: Towards Controlled Counterfactual Generation for Text. arXiv:2012.04698v2 [cs.CL] Mar. 17, 2021. 12 pages.
Manning et al., An Introduction to Information Retrieval. Cambridge University Press. 2009. 581 pages.
Mostafa, How do Internet search engines work? SCIAM. Nov. 29, 2004. 6 pages.
Nguyen et al., Example-Based Sentence Reduction Using the Hidden Markov Model. ACM Transactions on Asian Language Information Processing. 2004;3(2):146-58.
Paranjape et al., Retrieval-guided Counterfactual Generation for QA. arXiv:2110.07596v2 [cs.CL]. Mar. 29, 2022. 17 pages.
Rajpurkar et al., Know What You Don't Know: Unanswerable Questions for SQuAD. Proceedings of the 56$^{th}$ Annual Meeting of the Association for Computational Linguistics. 2018;784-9.
Reimers et al., Sentence-BERT: Sentence Embeddings using Siamese BERT-Networks. arXiv: 1908.10084v1 [cs.CL]. Aug. 27, 2019. 11 pages.
Sitikhu et al., A Comparison of Semantic Similarity Methods for Maximum Human Interpretability. arXiv:1910.09129v2 [cs.IR]. Oct. 31, 2019. 4 pages.
Slimani, Description and Evaluation of Semantic similarity Measures Approaches. International Journal of Computer Applications. 2013;80(10). 10 pages.
Sravanthi et al., Semantic Similarity Between Sentences. International Research Journal of Engineering and Technology (IRJET). 2017;4(1):156-61.
Srivastava et al., Data Preprocessing Techniques in Web Usage Mining: A Literature Review. Proceedings of International Conference on Sustainable Computing in Science, Technology, and Management. SUSCOM. 2019. 11 pages.
Sunilkumar et al., A Survey on Semantic Similarity. ResearchGate. Mar. 2021. 9 pages.
Takahashi, Got It AI creates truth checker for ChatGPT 'hallucinations'. Venture Beat. https://venturebeat.com/ai-got-it-ai-creates-truth-checker-for-chatgpi-hallucinations/ Jan. 13, 2023. 12 pages.
Upadhyay et al., A Review Analysis of Preprocessing Techniques in Web usage Mining. International Journal of Engineering Research & Technology (IJERT). 2015;4(4). 7 pages.
Wu et al., Polyjuice: Generating Counterfactuals for Explaining, Evaluating, and Improving Models. arXiv:2101.00288v2 [cs.CL]. Jun. 1, 2021. 17 pages.
Yang et al., Strongly Incremental Constituency Parsing with Graph Neural Networks. 34$^{th}$ Conference on Neural Information Processing Systems (NeurIPS). 2020. 20 pages.
Zhang et al., Machine Reading Comprehension: The Role of Contextualized Language Models and Beyond. arXiv:2005.06249v1 [cs.CL]. May 13, 2020. 51 pages.

* cited by examiner

TECHNIQUES FOR VERIFYING A VERACITY OF MACHINE LEARNING OUTPUTS

FIELD

The techniques described herein relate generally to machine learning and, more particularly, to techniques for verifying a veracity of machine learning outputs.

BACKGROUND

Machine learning (ML) generally refers to the field of deploying computer algorithms (and/or associated hardware) that iteratively improve by using data in applications (e.g., real-world applications, simulated applications) to generate outputs and provide feedback of an evaluation of the outputs to the computer algorithms. Some ML models may generate outputs in response to prompts requesting information. Typically, such ML models provide the outputs without attesting to their veracity.

SUMMARY

Some embodiments relate to an apparatus for verifying information in an output produced by a first trained machine learning (ML) model in response to an input. The apparatus includes at least one memory to store computer-readable instructions, and at least one computer hardware processor to execute the computer-readable instructions to: (A) receive a first output generated by the first trained ML model in response to a first input, the first output comprising text; (B) parse the first output into one or more verifiable statements; (C) verify, using a second trained ML model and first reference data accessed from at least one first datastore via at least one first communication network, the one or more verifiable statements to produce first verification results, the first verification results indicating which of the one or more verifiable statements has been verified; (D) determine, based on the first verification results, whether any of the one or more verifiable statements remains unverified; (E) when it is determined that at least one of the one or more verifiable statements remains unverified, query the first trained ML model with a request to provide information identifying at least one second datastore having second reference data attesting to veracity of the first output; and verify, using the second trained ML model and the second reference data accessed from the at least one second datastore via the at least one first communication network or at least one second communication network, the at least one unverified statement to produce second verification results; and (F) provide output indicating whether one or more of the one or more verifiable statements have been verified based on at least one of the first verification results or the second verification results.

Some embodiments relate to at least one non-transitory computer-readable storage medium comprising instructions that, when executed by at least one computer hardware processor, cause the at least one computer hardware processor to perform a method for verifying information in an output produced by a first trained machine learning (ML) model in response to an input. The method includes: (A) receiving a first output generated by the first trained ML model in response to a first input, the first output comprising text; (B) parsing the first output into one or more verifiable statements; (C) verifying, using a second trained ML model and first reference data accessed from at least one first datastore via at least one first communication network, the one or more verifiable statements to produce first verification results, the first verification results indicating which of the one or more verifiable statements has been verified; (D) determining, based on the first verification results, whether any of the one or more verifiable statements remains unverified; (E) when it is determined that at least one of the one or more verifiable statements remains unverified, querying the first trained ML model with a request to provide information identifying at least one second datastore having second reference data attesting to veracity of the first output; and verifying, using the second trained ML model and the second reference data accessed from the at least one second datastore via the at least one first communication network or at least one second communication network, the at least one unverified statement to produce second verification results; and (F) providing output indicating whether one or more of the one or more verifiable statements have been verified based on at least one of the first verification results or the second verification results.

Some embodiments relate to a method for verifying information in an output produced by a first trained machine learning (ML) model in response to an input. The method includes using at least one computer hardware processor to perform: (A) receiving a first output generated by the first trained ML model in response to a first input, the first output comprising text; (B) parsing the first output into one or more verifiable statements; (C) verifying, using a second trained ML model and first reference data accessed from at least one first datastore via at least one first communication network, the one or more verifiable statements to produce first verification results, the first verification results indicating which of the one or more verifiable statements has been verified; (D) determining, based on the first verification results, whether any of the one or more verifiable statements remains unverified; (E) when it is determined that at least one of the one or more verifiable statements remains unverified, querying the first trained ML model with a request to provide information identifying at least one second datastore having second reference data attesting to veracity of the first output; and verifying, using the second trained ML model and the second reference data accessed from the at least one second datastore via the at least one first communication network or at least one second communication network, the at least one unverified statement to produce second verification results; and (F) providing output indicating whether one or more of the one or more verifiable statements have been verified based on at least one of the first verification results or the second verification results.

Some embodiments relate to another method for verifying information in an output produced by a first model in response to an input. The method includes: using at least one computer hardware processor to perform: (A) receiving a first output generated by the first model in response to a first input, the first output comprising one or more verifiable statements in text; (B) verifying, using a second model and first reference data stored in at least one first datastore, the one or more verifiable statements to produce first verification results indicating which of the one or more verifiable statements has been verified; (C) when it is determined that at least one of the one or more verifiable statements remains unverified based on the first verification results, identifying, using at least one of the first model or the second model, at least one second datastore having second reference data attesting to veracity of the first output; and verifying, using the second model and the second reference data, the at least one unverified statement to produce second verification results; and (D) providing output indicating whether one or more of the one or more verifiable statements have been verified based on at least one of the first verification results or the second verification results.

The foregoing summary is not intended to be limiting. Moreover, various aspects of the present disclosure may be implemented alone or in combination with other aspects.

BRIEF DESCRIPTION OF FIGURES

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
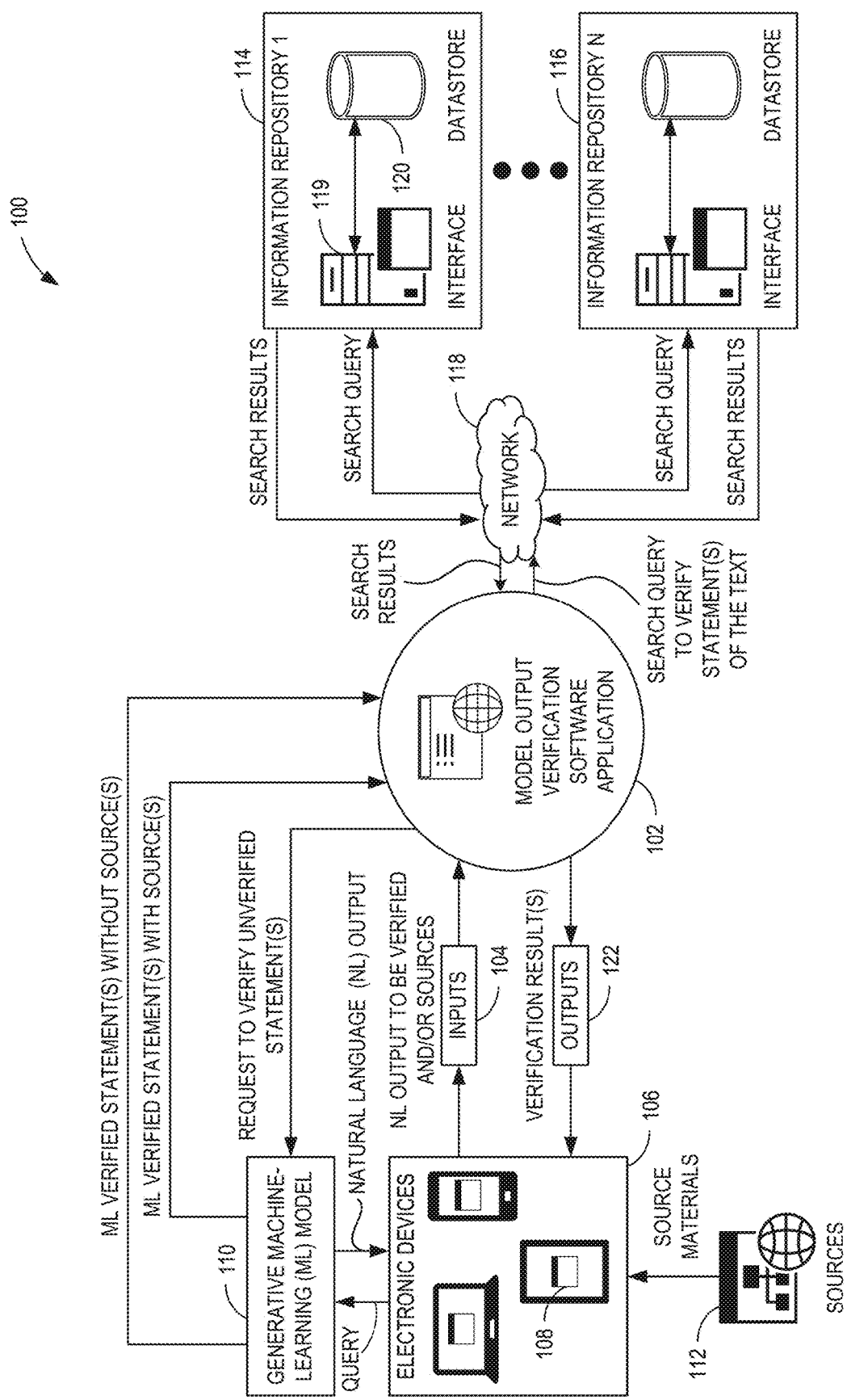
FIG. 1 illustrates an example model output verification system including a model output verification software application to attest a veracity of an output from a model, according to some embodiments.

The inventors have developed techniques for verifying information in outputs generated by a model, for example, a machine learning (ML) model. An example use case for the techniques developed by the inventors is using such techniques to verify information in outputs generated by a generative ML model, such as a large language model (LLM) that may be used as part of a chatbot or other software solutions, which is important because such generative ML models may produce output that is incorrect, non-responsive, and/or not accurate.

Machine learning refers to a field of artificial intelligence (AI) that involves creating, deploying, and/or using computer software that can learn to perform a task from data and whose performance on the task can improve when additional data is provided. Such computer software may use one or more machine learning models (e.g., neural networks, large language models, hidden Markov models, and other types of models, examples of which are provided herein).

A machine learning model may include parameters. Those parameters may be assigned values. For example, a neural network model may include millions of parameters or more (sometimes termed "weights") and those parameters may be assigned values (i.e., the values of the weights). A machine learning model may be used to process an input to generate a respective output and to do so, the input and the ML model parameter values may be used to calculate the respective output. As such, the output depends on the input and on the values of the parameters of the ML model. For example, a neural network (e.g., an LLM) can generate output text based on an input prompt and values of the neural network's parameters.

Accordingly, prior to using an ML model to process inputs to generate respective outputs, parameters of the ML models are assigned values. The process of assigning values to parameters of an ML model based on data (e.g., numerous examples of input-output pairs) is sometimes termed "training" and the data that is used to determine the parameter values to assign is sometimes termed "training data". Determining values of ML model parameters from training data is sometimes referred to as "learning" or "estimating" ML model parameters. There are various techniques for training ML models including supervised, semi-supervised, and unsupervised techniques for training ML models.

Machine learning models include discriminative ML models and generative ML models. Discriminative models may be trained to perform a classification task—the task of separating data points into different "classes". For example, a discriminative model may be trained to determine whether a medical image of a patient indicates the presence of a cancer. In this way, this discriminative model separates images (the "data points" in this context) into two different classes: medical images that indicate the presence of a cancer and medical images that do not indicate the presence of the cancer. To this end, a discriminative model may be trained to perform the classification task by learning boundaries between classes among which the model is being trained to discriminate. Non-limiting examples of ML models that can be trained to operate as discriminative models include clustering, decision trees, logistic regression, neural networks, random forests, and support vector machines.

Unlike discriminative models, which may be able only to discriminate between different types of data, generative models may be trained to generate new examples of data. For example, instead of merely being able to separate medical images into two classes (e.g., medical images indicating presence of a cancer and medical images not indicating the presence of the cancer), a generative model may be trained and used to generate new examples of medical images (not present in the training data) that indicate the presence of the cancer. As another example, a generative model may be trained and used to generate new text examples, new image examples, new sound examples, new biological sequence (e.g., protein sequence) examples, etc. To this end, a generative model may learn the underlying statistical distribution of the data using examples of that data present in the training data and, in turn, use the learned representation of that data distribution to generate new data examples. The manner in which that distribution is utilized may depend on input to the generative ML model.

In some examples, a generative ML model may be trained to generate content in response to an input. For example, a generative ML model may be configured to generate text in response to an input textual prompt. A chatbot, such as ChatGPT, is one example of such a generative ML model because it is trained to generate natural language text responsive to text input, which may be a prompt from the user. As another example, a generative ML model may be configured to generate an image based on an input textual prompt. A text-to-image model, such as DALL-E, is another example of such a generative ML model because it is trained to generate digital images in response to text input, which may be a prompt from the user.

An example generative model may be a large language model (LLM). An LLM is a trained deep-learning model that understands and, in some instances, generates natural language text. Some LLMs may generate new combinations of natural language text in the form of natural-sounding language while some LLMs may generate other types of output such as new audio, images, video, and/or any combination(s) thereof. By way of example, a user (e.g., a human user, a machine user) may provide an input prompt, which may include text, to an LLM to solicit output from the LLM responsive to the input prompt. In such an example, the input prompt may be a request for a fact or a listing of facts such as "When did the last state join the United States of America?" or "What are the three largest cities in the United States of America by population?" An LLM model may generate outputs in the form of one or more constituent statements in text such as "The last states to join the United States of America were Alaska and Hawaii. Both states joined the United States of America in 1959." to the former input prompt or "The three largest cities in the United States of America by population are New York City, Los Angeles, and Chicago." to the latter input prompt. By way of another example, the input prompt may be subjective in nature such as "What are the public policy arguments for and against government subsidization of electric vehicle purchases?" An LLM model may generate outputs in the form of one or more constituent statements in text conveying such public policy arguments.

The inventors have recognized that generative models, such as LLMs, may output false and/or misleading information. Such false/misleading outputs may be referred to as "hallucinations" or "confabulations." For instance, an LLM may generate an output responsive to a prompt that may appear plausible, because the LLM is designed to produce fluent, coherent text, but the output may deviate from external facts, contextual logic, or both. For example, an LLM may, responsive to the prompt of "Name three cities in the United States", output "New York City, Los Angeles, Toronto". Because Toronto is not a city in the United States, the LLM in this case hallucinated the output. The inventors have recognized that LLMs may have such a shortcoming because LLMs have no understanding of the underlying reality that language describes and instead uses statistics to generate language that is grammatically and semantically correct within the context of the prompt. The inventors have also recognized that hallucinations may also appear in connection with audio, images, and/or video output by generative models. The inventors have recognized that generative models provide outputs to prompts without attesting to their veracity, which may cause users providing the prompts to treat the outputs as legitimate.

The inventors have developed technology that mitigates (e.g., reduces or eliminates) the unreliability of model outputs (e.g., ML model outputs, generative ML model outputs) by attesting the veracity of the model outputs. In some embodiments, the technology developed by the inventors mitigates the unreliability of model outputs by corroborating the model outputs using information from reliable and/or reputable data sources. By way of example, the technology developed by the inventors may include obtaining a model output to be verified, which may include one or more verifiable statements. The technology developed by the inventors may access publicly available and reliable data sources, such as websites and/or data repositories accessible via the Internet, to determine whether a verifiable statement output from a model can be verified by evaluating the publicly accessible data sources. In some embodiments, the technology developed by the inventors may execute natural language processing (NLP) and/or ML techniques to comprehend information in the data sources and determine whether the verifiable statement has the same or substantially similar meaning to the information in the data sources. The NLP and/or ML techniques may generate output indicative of whether the model outputs are verified or unverified, which may indicate to a user whether the ML model hallucinated the model outputs.

In some embodiments, the technology developed by the inventors mitigates the unreliability of model outputs by generating and evaluating counterfactuals to model outputs to be verified. For example, the technology developed by the inventors may include altering, changing, and/or modifying a semantic meaning of a model output to attest its veracity. By way of example, the technology developed by the inventors may generate a counterfactual statement of "The Czech Republic is not a landlocked country." to a model output of "The Czech Republic is a landlocked country." The technology developed by the inventors may search a data repository for the model output and identify related statements that are contradictory to, or that have some degree of variance from, the model output. The technology developed by the inventors may access publicly available and reliable data sources to determine which of the counterfactual statement or the model output is true. For example, the model output may be determined to be true after determining that the counterfactual statement is false or, conversely, that the model output is false after determining that the counterfactual statement is true. The technology developed by the inventors is not so limited to attesting a model output using counterfactual statement(s) and may also encompass attesting a model output using related statement(s) to the model output that may vary in degree to which the related statement(s) is/are different in semantic understanding to the model output. The technology developed by the inventors is also not so limited to generate counterfactual statements that are opposite in semantic meaning to a model output and may also encompass generating counterfactual statements that have varying degrees of differences in semantic meaning to the model output.

In some embodiments, the technology developed by the inventors mitigates the unreliability of model outputs by assigning a metric to respective model outputs indicating a degree to which a model output is verified. For example, the technology developed by the inventors may generate a score, such as a verification score, indicative of a degree to which the model output is not verified, partially verified, or verified based on a comparison of the model output to data source(s), such as publicly accessible and reliable data source(s). In some embodiments, the technology developed by the inventors may generate a score, such as a reliability score, indicative of a degree to which the ML model itself is reliable to generate verified output. For example, the score may indicate a probability to which the ML model is likely to hallucinate the output. Beneficially, a user is provided quantifications (e.g., a verification score for respective model outputs) of evaluating ML model output for its veracity and/or an indication (e.g., a reliability score) that the ML model is reliable and/or otherwise is likely with a relatively high probability to generate verified output.

Beneficially, the technology developed by the inventors improves machine learning and/or, more generally, AI technology. For example, the technology developed by the inventors may be used to retrain an ML model (e.g., an ML model that is susceptible and/or is known to output hallucinations) to increase an accuracy and/or reliability of the ML model outputs. In some embodiments, the technology developed by the inventors may provide feedback to the ML model indicative of a degree to which outputs of the generative ML model are accurate, responsive to input prompt(s), and/or are beneficial to user(s) providing the input prompt(s). For example, the ML model may be trained at least in part based on the provided feedback.

Beneficially, the technology developed by the inventors mitigates the unreliability of model outputs and improves operation of computing systems. For example, by attesting a veracity of model outputs by corroborating them against information provided by known and/or reliable data sources, a user's computing system requires less memory and/or storage resources to attest the veracity of such outputs. For example, the information that may be used to corroborate the model outputs are stored in datastores accessible via at least one computer-implemented network, such as the Internet, and may be queried upon demand instead of being stored locally on the user's computing system. In some such embodiments, the user's computing system can perform functions, such as evaluating model outputs, with a reduced number of computational resources (e.g., computer hardware processor resources, memory resources, mass storage resources).

Beneficially, the technology developed by the inventors improves operation of ML models by effectuating a new ML training paradigm in which ML outputs are independently attested for their veracity and ML models are trained based at least in part on the independent attestations. In some embodiments, the technology developed by the inventors may cause periodic retraining of the ML model, such as triggering a retraining after a specific period of time since the last retraining has elapsed. In some embodiments, the technology developed by the inventors may cause aperiodic training of the ML model, such as when a threshold amount of generated feedback data has been reached and/or satisfied. Additionally or alternatively, the technology developed by the inventors may cause aperiodic training of the ML model when the average veracity score of the ML model falls below a specified threshold. In some such embodiments, the ML model may be trained with data obtained from the verification process (as described herein) that determined that the model output was not verified. By periodically or aperiodically retraining the ML model, the technology developed by the inventors iteratively improves an accuracy and/or reliability of the ML model such that the ML model reduces hallucination outputs over time.

Accordingly, some embodiments provide for an apparatus (e.g., the electronic platform shown in FIG. 7) for verifying information in an output (e.g., the natural language output shown in FIG. 1, the natural language output to be verified shown in FIG. 2B) produced by a first trained machine learning (ML) model (e.g., the generative ML model shown in FIG. 1) in response to an input (e.g., the query shown in FIG. 1). The apparatus includes: at least one memory (e.g., the memory shown in FIG. 7, the processor memory shown in FIG. 7) to store computer-readable instructions (e.g., the instructions shown in FIG. 7); and at least one computer hardware processor (e.g., the processor circuitry shown in FIG. 7) to execute the computer-readable instructions to: (A) receive a first output (e.g., the natural language output shown in FIG. 1, the natural language output to be verified shown in FIG. 2B) generated by the first trained ML model in response to a first input (e.g., the query shown in FIG. 1), the first output comprising text; (B) parse the first output into one or more verifiable statements (e.g., the individual verifiable statements shown in FIG. 2B); (C) verify, using a second trained ML model (e.g., the search module shown in FIGS. 2A and/or 2B) and first reference data accessed from at least one first datastore (e.g., one(s) of the datastores shown in FIG. 1) via at least one first communication network (e.g., the at least one network shown in FIG. 1, the at least one network shown in FIG. 2B), the one or more verifiable statements to produce first verification results (e.g., the outputs shown in FIG. 1, the verified and/or unverified statements shown in FIG. 2B), the first verification results indicating which of the one or more verifiable statements has been verified; (D) determine, based on the first verification results, whether any of the one or more verifiable statements remains unverified; (E) when it is determined that at least one of the one or more verifiable statements remains unverified, query the first trained ML model with a request to provide information identifying at least one second datastore (e.g., one(s) of the datastores shown in FIG. 1) having second reference data attesting to veracity of the first output; and verify, using the second trained ML model and the second reference data accessed from the at least one second datastore via the at least one first communication network or at least one second communication network (e.g., the at least one network shown in FIG. 1, the at least one network shown in FIG. 2B), the at least one unverified statement to produce second verification results (e.g., the outputs shown in FIG. 1, the verified and/or unverified statements shown in FIG. 2B); and (F) provide output (e.g., the verification result(s) shown in FIG. 2B) indicating whether one or more of the one or more verifiable statements have been verified based on at least one of the first verification results or the second verification results.

In some embodiments, the at least one computer hardware processor is to process the first input using the first trained ML model to obtain the first output.

In some embodiments, the first trained ML model is a trained generative ML model (e.g., the generative ML model shown in FIG. 1), and the at least one computer hardware processor is to receive the first output generated by the trained generative ML model.

In some embodiments, the at least one computer hardware processor is to execute a model (e.g., the parsing module shown in FIGS. 2A and/or 2B) configured to identify constituent statements in text to parse the first output into one or more verifiable statements.

Figure 2A:
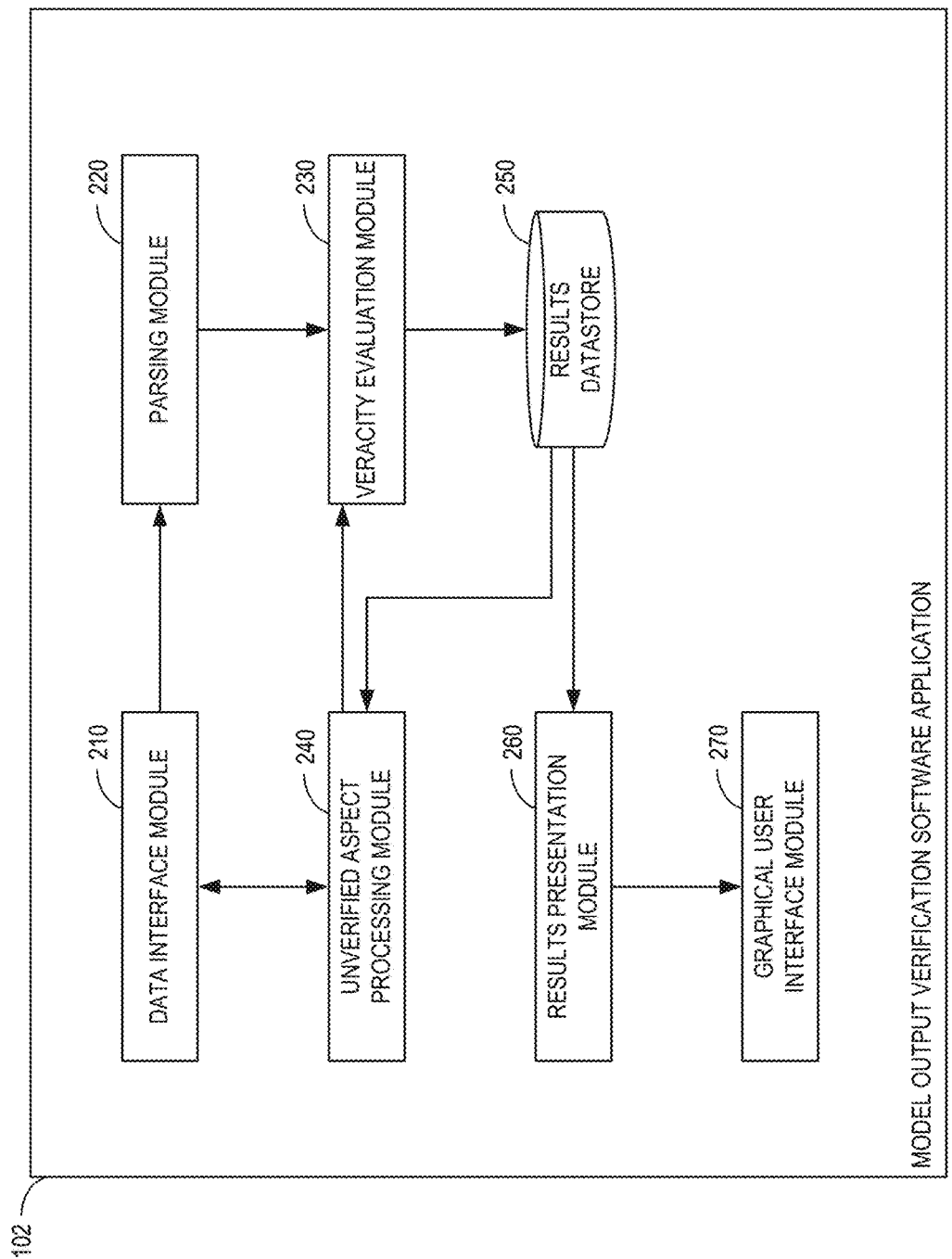
FIG. 2A is a block diagram of an example implementation of the model output verification software application of FIG. 1, according to some embodiments.
Figure 2B:
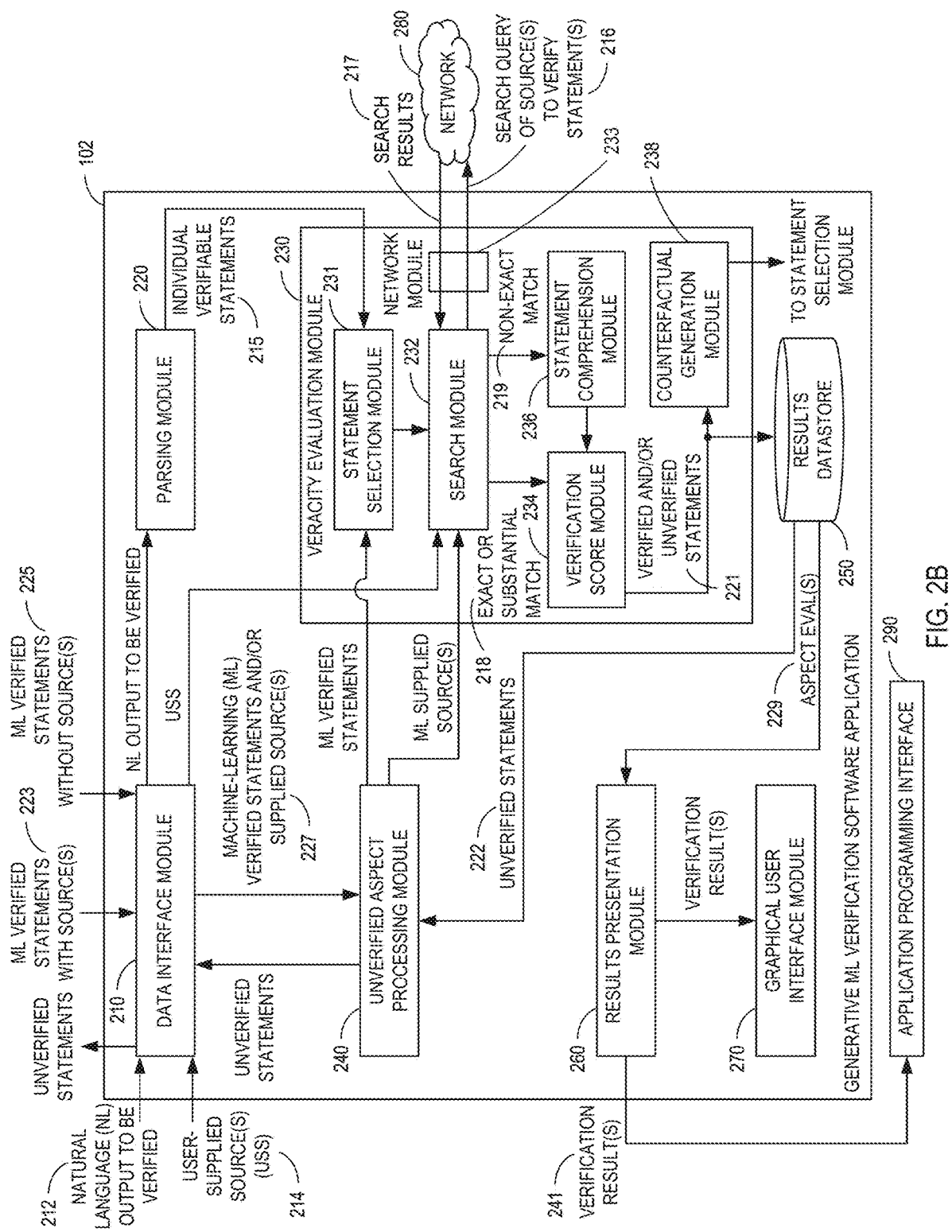
FIG. 2B is a block diagram of another example implementation of the model output verification software application of FIG. 1 and/or FIG. 2A, according to some embodiments

In some embodiments, the at least one computer hardware processor is to execute the second trained ML model to parse the first output into one or more verifiable statements (e.g., the individual verifiable statements shown in FIG. 2B).

In some embodiments, the first datastore and the second datastore are the same.

In some embodiments, the at least one computer hardware processor is to: determine that a first verifiable statement of the one or more verifiable statements substantially matches the first reference data; assign a verification score to the first verifiable statement in accordance with the first verifiable statement substantially matching the first reference data; and record, in at least one third datastore (e.g., the results datastore shown in FIGS. 2A and/or 2B), one or more data associations of at least one of the first verifiable statement, the verification score, or an identification of a data source of at least a portion of the first reference data that substantially matches the first verifiable statement.

In some embodiments, at least one of the first datastore, the second datastore, or the third datastore are the same.

In some embodiments, the at least one computer hardware processor is to: determine that a first verifiable statement of the one or more verifiable statements at least partially matches the first reference data; execute the second trained ML model using the first verifiable statement and at least one portion of the first reference data as at least one second input to generate a third output representing that a first semantic meaning of the first verifiable statement corresponds to a second semantic meaning of the at least one portion of the first reference data; assign a verification score to the first verifiable statement in accordance with at least one of the at least partial matching or the correspondence of the first and second semantic meanings; and record, in at least one third datastore (e.g., the results datastore shown in FIGS. 2A and/or 2B), one or more data associations of at least one of the first verifiable statement, the verification score, or an identification of a data source of the at least one portion of the first reference data.

In some embodiments, the at least one computer hardware processor is to: determine that a first verifiable statement of the one or more verifiable statements does not substantially match the first reference data; execute the second trained ML model using the first verifiable statement and at least one portion of the first reference data as at least one second input to generate a third output representing that the first verifiable statement is verified based on the at least one portion of the first reference data; assign a verification score to the first verifiable statement in accordance with at least one of the first verifiable statement not substantially matching the first reference data or the verification of the first verifiable statement based on the at least one portion of the first reference data; and record, in at least one third datastore (e.g., the results datastore shown in FIGS. 2A and/or 2B), one or more data associations of at least one of the first verifiable statement, the verification score, or an identification of a data source of the at least one portion of the first reference data.

In some embodiments, the one or more verifiable statements comprise a first verifiable statement, and the at least one computer hardware processor is to: execute the second trained ML model using the first verifiable statement and the first reference data as at least one second input to generate a third output indicating that a first semantic meaning of the first verifiable statement does not correspond to one or more second semantic meanings associated with the first reference data; and identify the first verifiable statement as one of the at least one unverified statement based at least in part on the third output.

In some embodiments, the one or more verifiable statements comprise a first verifiable statement, and the at least one computer hardware processor is to: generate a related statement based on the first verifiable statement, the first verifiable statement having a first semantic meaning different than a second semantic meaning of the related statement; execute the second trained ML model using the related statement and the first reference data as at least one second input to generate a third output representing that the second semantic meaning of the related statement does not correspond to at least one of one or more third semantic meanings associated with the first reference data; and verify the first verifiable statement based at least in part on the second semantic meaning not corresponding to the at least one of the one or more third semantic meanings.

In some embodiments, the at least one computer hardware processor is to generate the related statement as a counterfactual statement.

In some embodiments, the at least one computer hardware processor is to generate the first semantic meaning to be opposite the second semantic meaning.

In some embodiments, the at least one computer hardware processor is to verify, with the second trained ML model, that the output is responsive to the input.

In some embodiments, the at least one computer hardware processor is to generate the output to comprise at least one of a citation to a data source of the output, a network link to the data source of the output, and/or a verification score associated with the data source of the output.

In some embodiments, the at least one computer hardware processor is to, after processing a plurality of outputs by the first trained ML model, assign a reliability score indicative of a degree to which the first trained ML model is likely to output verified statements.

Figure 7:
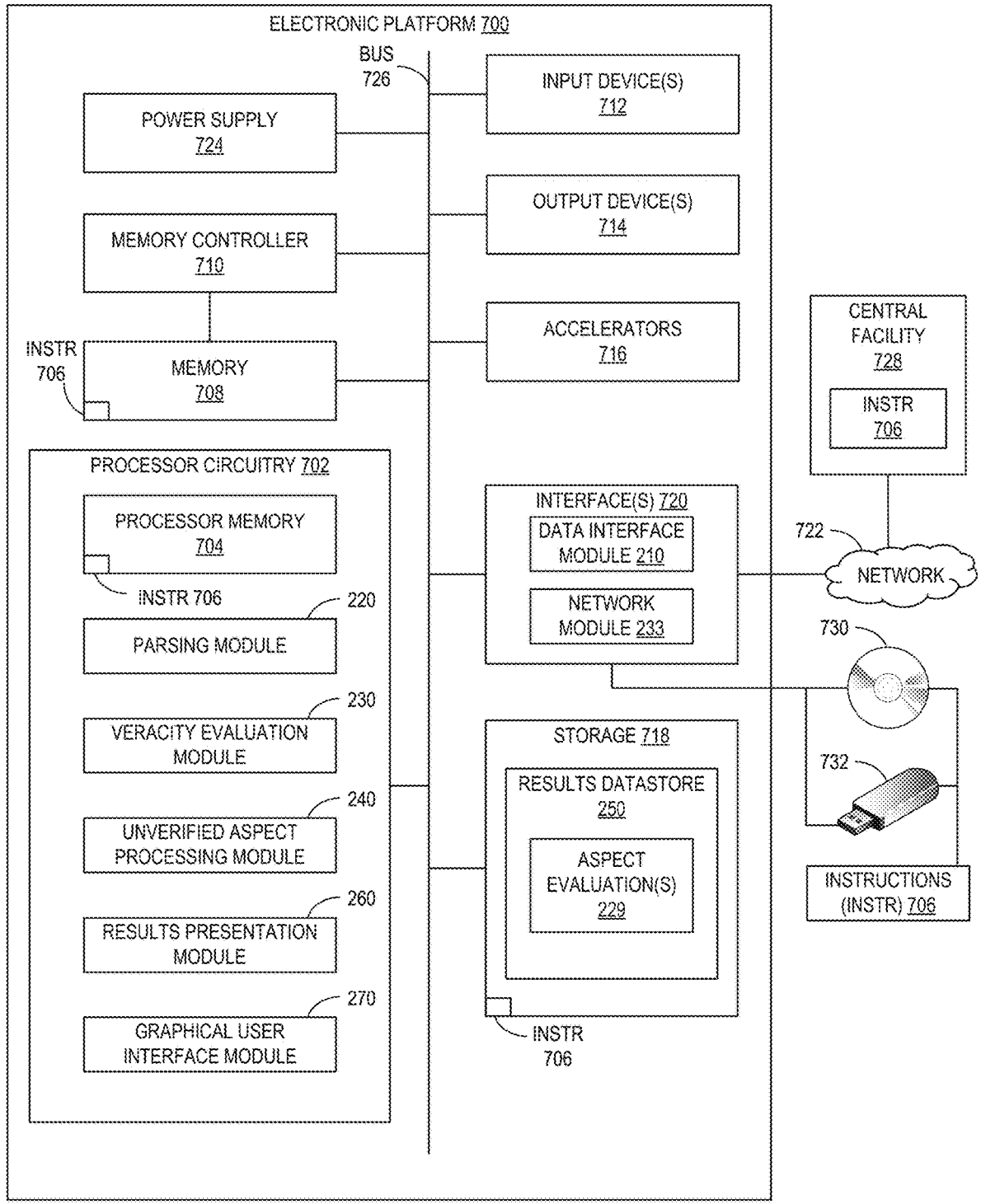
FIG. 7 is an example electronic platform structured to execute the machine-readable instructions of FIGS. 3, 4, 5, and/or 6 to implement the model output verification software application of FIGS. 1, 2A, and/or 2B, according to some embodiments.

In some embodiments, the at least one computer hardware processor is a neuromorphic hardware processor (e.g., the processor circuitry shown in FIG. 7).

Some embodiments provide for another method for verifying information in an output (e.g., the natural language output shown in FIG. 1, the natural language output to be verified shown in FIG. 2B) produced by a first model (e.g., the generative ML model shown in FIG. 1) in response to an input (e.g., the query shown in FIG. 1). The method includes: using at least one computer hardware processor (e.g., the processor circuitry shown in FIG. 7) to perform: (A) receiving a first output (e.g., the natural language output shown in FIG. 1, the natural language output to be verified shown in FIG. 2B) generated by the first model in response to a first input (e.g., the query shown in FIG. 1), the first output comprising one or more verifiable statements in text (e.g., the individual verifiable statements shown in FIG. 2B); (B) verifying, using a second model (e.g., the search module shown in FIGS. 2A and/or 2B) and first reference data stored in at least one first datastore (e.g., one(s) of the datastores shown in FIG. 1), the one or more verifiable statements to produce first verification results (e.g., the outputs shown in FIG. 1, the verified and/or unverified statements shown in FIG. 2B) indicating which of the one or more verifiable statements has been verified; (C) when it is determined that at least one of the one or more verifiable statements remains unverified based on the first verification results, identifying, using at least one of the first model or the second model, at least one second datastore (e.g., one(s) of the datastores shown in FIG. 1) having second reference data attesting to veracity of the first output; and verifying, using the second model and the second reference data, the at least one unverified statement to produce second verification results (e.g., the outputs shown in FIG. 1, the verified and/or unverified statements shown in FIG. 2B); and (D) providing output (e.g., the verification result(s) shown in FIG. 2B)

indicating whether one or more of the one or more verifiable statements have been verified based on at least one of the first verification results or the second verification results.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 illustrates an example model output verification system 100 including a model output verification software application 102 configured and/or executable to attest a veracity of an output from a model. In some embodiments, the model is a machine learning (ML) model, such as a neural network. For example, the model may be a neural network, such as a deep neural network. A non-limiting example of a deep neural network is a large language model (LLM). Alternatively, the model may be any other type of ML model such as a generative adversarial network (GAN). Non-limiting examples of ML models include generative adversarial networks (GANs), large language models (LLMs), and neural networks (NNs). Any other type of ML model is contemplated. Alternatively, the model may be any type of non-ML model. Non-limiting examples of non-ML models include computer-implemented decision trees, Markov Chains, template-based generation models, and context-free grammars (CFGs). For example, outputs of the computer-implemented decision trees, the Markov Chains, the template-based generation models, and/or the CFGs may be natural language outputs. For example, Markov Chains can be used to generate text by transitioning from one state to another based on a set of probability distributions. In this context, states often correspond to words or sequences of words, and the probability distributions are derived from the frequency of words or sequences in a training corpus. In template-based generation, text can be generated using pre-defined templates where specific slots are filled in based on certain rules or heuristics. This technique can be used in natural language generation (NLG) systems for tasks like report generation or automated messaging. CFGs are sets of recursive rewriting rules or productions. By applying these rules in a random or guided manner, it is possible to generate a wide variety of sentences. Any other type of model is contemplated.

In the illustrated example, the model output verification software application 102 is a software application configured and/or executable to verify output(s) from a generative model (e.g., a generative ML model), such as an LLM. Alternatively, the model output verification software application 102 may be configured and/or executable to verify output(s) from any other type of model described herein.

In the illustrated example, the model output verification software application 102 may obtain inputs 104 from one or more electronic devices 106. The electronic devices 106 may be associated with one or more users (e.g., human user(s), machine user(s)). Non-limiting examples of the inputs 104 include audio, image(s), natural language (e.g., text), video, and sources. Any other type of input is contemplated. Non-limiting examples of the sources may be data and/or information sources of the provided audio, image(s), natural language (e.g., text), and/or video. Any other type of source is contemplated. In some embodiments, the data and/or information sources may be identified using a uniform resource locator (URL) of a website and/or webpage, a name of an information repository that hosts and/or manages the data and/or information sources, a title or citation (e.g., a title or citation of an article, book, journal, magazine, etc.) and/or any combination(s) thereof. Non-limiting examples of the electronic devices 106 include laptop computers, tablet computers, cellular phones (e.g., smartphones), televisions (e.g., smart televisions), virtual assistants (e.g., SIRI®, ALEXA®, BIXBY®, etc.), and wearable devices (e.g., headphones, headsets, smartwatches, smart glasses, etc.). Any other type of electronic device is contemplated.

The inputs 104 of the illustrated example include natural language outputs to be verified (e.g., text) and/or sources. For example, the inputs 104 may include one or more words, one or more constituent statements in text, and/or one or more data sources associated with and/or related to the one or more words and/or the one or more constituent statements. For example, the electronic devices 106 may provide a query, using a graphical user interface (GUI) 108, to a generative ML model 110. Alternatively, the model output verification software application 102 may generate and/or provide the query. The generative ML model 110 of this example is an LLM. Non-limiting examples of LLMs include generative pre-trained transformers (GPT), bidirectional encoder representations from transformers (BERT), any one(s) of a family of LLMs known as Large Language Model Meta AI (LLaMA), robustly optimized BERT pre-training approach (RoBERTa) models, and pathways language models (PaLMs). Any other type of LLM is contemplated. Alternatively, the generative ML model 110 may be any other type of model described herein. The query may be a prompt, such as a voice-based or natural-language-based prompt, requesting information responsive to and/or conforming to the prompt. Responsive to the prompt, the generative ML model 110 may generate and/or output natural language (e.g., text) conveying information to address the prompt. By way of example, the query to the generative ML model 110 may be a natural-language-based prompt (e.g., a text-based prompt) such as "Who was the first president of the United States of America?" and the natural-language-based output from the generative ML model 110 may be "George Washington was the first president of the United States of America." The electronic devices 106 may provide and/or output the natural language output to the model output verification software application 102.

In some embodiments, the electronic devices 106 may obtain source materials (e.g., data source materials) from one or more sources 112 for verification by the model output verification software application 102. Non-limiting examples of source materials include audio, a document, an e-mail, a file, a data set, an image, a list, a message, a report, a spreadsheet, text, and a video. Any other type of source material is contemplated. By way of example, the electronic devices 106 may download and/or otherwise obtain from the Internet a news article from an online news provider. In such an embodiment, a user associated with the electronic devices 106 may want to verify a veracity of the news article, or portion(s) thereof. The user may provide the news article, or portion(s) thereof, to the model output verification software application 102 for verification in accordance with the techniques described herein. Alternatively, the electronic devices 106 may obtain the source materials in any other way, such as by loading the source materials onto the electronic devices 106 from removable media such as a universal serial bus (USB) drive, an external hard disk drive (HDD), etc.

In some embodiments, the model output verification software application 102 is implemented by one or more servers (e.g., computer servers) accessible via a network (e.g., a computer-implemented network). For example, the model output verification software application 102 may be implemented by one or more physical servers and/or virtualizations of the one or more physical servers. In some embodiments, the one or more servers are hosted by a cloud provider (e.g., a public cloud provider, a private cloud provider) and/or an enterprise network. By way of example, the electronic devices 106 may access the model output verification software application 102 via at least one network such as the Internet or any other type of network described herein. In such an embodiment, the electronic devices 106 may access the model output verification software application 102 using a browser (e.g., a web browser, an Internet browser) on the electronic devices 106. In some embodiments, the model output verification software application 102 can be a plug-in (e.g., an application plug-in, a browser plug-in) and/or a widget (e.g., an operating system desktop accessory, an applet, a software widget) on the electronic devices 106.

In some embodiments, the model output verification software application 102 may be installed locally on the electronic devices 106 as a standalone application. For example, the model output verification software application 102 can be an application installed on and/or executed by the electronic devices 106. By way of example, the electronic devices 106 can download and/or otherwise obtain an installation executable that, when installed on the electronic devices 106, can instantiate, execute, and/or implement the model output verification software application 102.

In the illustrated example, in response to receiving the inputs 104 from the electronic devices 106, the model output verification software application 102 may verify the inputs 104, or portion(s) thereof, by performing a search for information that is curated, managed, and/or maintained by one or more information repositories 114, 116 accessible by at least one network 118. The at least one network 118 may be implemented by any wired and/or wireless network(s) such as one or more cellular networks (e.g., 4G LTE cellular networks, 5G cellular networks, future generation 6G cellular networks, etc.), one or more data buses, one or more local area networks (LANs), one or more optical fiber networks, one or more private networks (e.g., one or more closed networks), one or more public networks, one or more wireless local area networks (WLANs), one or more satellite networks, etc., and/or any combination(s) thereof. For example, the at least one network 118 may be the Internet, but any other type of private and/or public network is contemplated.

The information repositories 114, 116 shown in FIG. 1 represent entities that curate, host, and/or manage data and/or information. Non-limiting examples of the information repositories 114, 116 include encyclopedias, forums, guides, networks, portals, webpages, websites, the Securities and Exchange Commission's EDGAR database, the United States Patent and Trademark Office's Patent Center database, and the United States Code. For example, a first information repository 114 (identified by "INFORMATION REPOSITORY 1") may be a first website managed by a news media organization. In some embodiments, a second information repository 116 (identified by "INFORMATION REPOSITORY N") may be an Internet-based encyclopedia. Although only two information repositories 114, 116 are shown in FIG. 1, any other number and/or type of information repositories is/are contemplated.

The information repositories 114, 116 in the illustrated example of FIG. 1 respectively include one or more interfaces 119 and one or more datastores 120. Non-limiting examples of the interfaces 119 include application programming interfaces (APIs), graphical user interfaces (GUIs), and landing pages (e.g., landing webpages). For example, the model output verification software application 102 may retrieve data and/or information from the datastore 120 of the first information repository 114 via an API. In some embodiments, the model output verification software application 102 may inspect and/or extract data of interest from a landing page (or any other page) of the first information repository 114.

Searching information sources (e.g., repositories) is well understood but varies if the repository is very large (e.g., the Internet) or relatively small (e.g., a PDF or book). In instances of large repositories, such as the Internet, the process generally consists of the following operations: (i) crawling (the process where the search engine looks for new and updated content); (ii) indexing (once content is crawled, certain pieces of information from the content is added to a database, called an index, to enable rapid information retrieval); (iii) ranking (complex algorithms to rank the relevancy of content to a particular search); (iv) query processing (parsing a query to identify key terms and using the index to find relevant content); and (v) displaying results (e.g., the most relevant or "exact matches" at the top followed by near matches next). In instances of smaller sources like a digital book or PDF document the search process for an exact match may include a string-matching algorithm. The KMP algorithm, a linear-time algorithm, is one such algorithm that is used in various software applications for string-searching.

Additionally, the model output verification software application 102 may search for and/or retrieve information from a data source (e.g., the Internet, the information repositories 114, 116) using example techniques described by Brin et al. ("The anatomy of a large-scale hypertextual Web search engine." Computer Networks (1998), Volume 30: Pages 107-117), Knuth et al. ("Fast Pattern Matching in Strings." (1977) SIAM Journal on Computing, Vol. 6, Issue 2: Pages 323-350), Manning et al. ("Introduction to Information Retrieval." (2008) Cambridge University Press), Baeza-Yates et al. ("Modern Information Retrieval." (1999) ACM Press), Srivastava et al. ("Data Preprocessing Techniques in Web Usage Mining: A Literature Review." Proceedings of International Conference on Sustainable Computing in Science, Technology, and Management (SUSCOM) (2019)), Mark Levine ("An Introduction to Search Engines and Web Navigation." (2010) 2nd Edition, Published by Wiley), all of which are incorporated by reference herein in their entireties.

In some embodiments, the datastores 120 can be implemented by any technology for storing data. For example, the datastores 120 can be implemented by a volatile memory (e.g., a Synchronous Dynamic Random Access Memory (SDRAM), a Dynamic Random Access Memory (DRAM), a RAMBUS Dynamic Random Access Memory (RDRAM), etc.) and/or a non-volatile memory (e.g., flash memory). The datastores 120 may additionally or alternatively be implemented by one or more double data rate (DDR) memories, such as DDR, DDR2, DDR3, DDR4, mobile DDR (mDDR), etc. The datastores 120 may additionally or alternatively be implemented by one or more mass storage devices such as HDD(s), compact disk (CD) drive(s), digital versatile disk (DVD) drive(s), solid-state disk (SSD) drive(s), etc. While in the illustrated example the datastores 120 are illustrated as single datastores, the datastores 120 may be implemented by any number and/or type(s) of datastore. Furthermore, the data stored in the datastores 120 may be in any data format. Non-limiting examples of data formats include audio data, a flat file, binary data, comma delimited data, image data, tab delimited data, structured query language (SQL) structures, and video data.

In some embodiments, the datastores 120 may be implemented by a database system, such as one or more databases. The term "database" as used herein means an organized body of related data, regardless of the manner in which the data or the organized body thereof is represented. For example, the organized body of related data may be in the form of one or more of a table, a log, a map, a grid, a packet, a datagram, a frame, a file, an e-mail, a message, a document, a report, a list or in any other form.

By way of example, the model output verification software application 102 may receive natural language output (e.g., text) to be verified from the electronic devices 106. The model output verification software application 102 may generate a search query based on the natural language output to be verified, or portion(s) thereof such as a single statement or subset of words (e.g., keywords). For example, the model output verification software application 102 may parse the natural language output to be verified into one or more verifiable statements. In some embodiments, the model output verification software application 102 may parse a single statement into one or more words. The model output verification software application 102 may transmit the search query to one(s) of the information repositories 114, 116 that may be associated with the search query. For example, the model output verification software application 102 may transmit the search query to one or more of the information repositories 114, 116 based on whether the one or more of the information repositories 114, 116 manage data/information related to the search query. Additionally or alternatively, the model output verification software application 102 may provide the search query to an Internet search engine.

In response to the search query, the model output verification software application 102 may receive and/or obtain search results. For example, the model output verification software application 102 can issue a search query to an online encyclopedia and receive one or more encyclopedia pages, or portion(s) thereof such as paragraphs and/or snippets, as search results.

In some embodiments, the model output verification software application 102 may verify one or more statements of the natural language output to be verified by analyzing and/or evaluating the search results. For example, the model output verification software application 102 may execute a model, such as a model (e.g., an ML model) trained for reading and/or language comprehension, using the search results as input to generate at least one output. The at least one output may be representative of whether the one or more statements to be verified have the same, substantially the same, and/or different lexical and/or semantic meaning(s) with respect to the search results.

In some embodiments, the model output verification software application 102 may determine that at least one portion of the natural language output to be verified has been verified by searching the information repositories 114, 116. For example, the model output verification software application 102 may determine that the one or more statements to be verified have the same and/or substantially the same lexical and/or semantic meaning(s) with respect to the search results.

In some embodiments, the model output verification software application 102 may determine that at least one portion of the natural language output to be verified has not been verified by searching the information repositories 114, 116. For example, the model output verification software application 102 may determine that the one or more statements to be verified do not have the same and/or substantially the same lexical and/or semantic meaning(s) with respect to the search results.

In some embodiments, the model output verification software application 102 may request the generative ML model 110 to verify the unverified statements. For example, the model output verification software application 102 may generate a prompt representing a request to verify the unverified statements and provide one or more sources that the generative ML model 110 uses to verify the unverified statements. In such an embodiment, the generative ML model 110 generates an output responsive to the input prompt.

In some embodiments, the generative ML model 110 may generate the output to indicate a verification of one or more of the unverified statements and provide accompanying source(s). For example, the generative ML model 110 may generate an output that indicates that one or more of the unverified statements are verified and includes at least one source the generative ML model 110 used to verify the one or more of the unverified statements. For example, the at least one source may be a URL of a webpage/website, an article title, a book title, a title of a page in an online encyclopedia, etc.

In some embodiments, the model output verification software application 102 may access the provided source(s) to attest a veracity of the generative ML model 110 output. For example, the model output verification software application 102 may determine that the generative ML model 110 correctly verified the unverified statement(s) by determining that the provided source(s) verify the unverified statement(s). In some embodiments, the model output verification software application 102 may determine that the generative ML model 110 did not correctly verify the unverified statements by determining that the provided source(s) have been fabricated by the generative ML model 110 and/or otherwise do not exist in the form provided by the generative ML model 110. For example, the model output verification software application 102 may determine that the generative ML model 110 hallucinated the output by determining that the provided source(s) do(es) not exist.

In some embodiments, the model output verification software application 102 can determine that the output from the generative ML model 110 indicates a verification of one or more of the unverified statements without source(s). For example, the generative ML model 110 may generate an output that indicates that one or more of the unverified statements are verified but the output does not include at least one source the generative ML model 110 used to verify the one or more of the unverified statements. In some embodiments, the model output verification software application 102 may initiate a search of the information repositories 114, 116 to facilitate the verification of the unverified statement(s) after determining that the generative ML model 110 is unable to provide the source(s) for its verification(s).

In some embodiments, the model output verification software application 102 may utilize counterfactuals to verify unverified statements. For example, the model output verification software application 102 may alter, change, and/or modify a semantic meaning of an output from the generative ML model 110 to attest a veracity of the output and/or, more generally, the generative ML model 110. For example, the model output verification software application 102 may request the generative ML model 110 to verify the statement of "The Missouri River is the longest river in the United States of America." In such an embodiment, the generative ML model 110 may verify the statement. Responsive to the verification, the model output verification software application 102 may generate a counterfactual to the statement, which may be "The Missouri River is not the longest river in the United States of America." The model output verification software application 102 may perform a search of at least the information repositories 114, 116 using the counterfactual statement. In some embodiments, the model output verification software application 102 may determine that the verification by the generative ML model 110 is valid based on determining that the search results from at least the information repositories 114, 116 disprove the counterfactual statement. Alternatively, the model output verification software application 102 may determine that the verification by the generative ML model 110 is not valid based on determining that the search results from at least the information repositories 114, 116 prove the counterfactual statement. In such an embodiment, by proving the counterfactual statement to be correct, the model output verification software application 102 may determine that the output from the generative ML model 110, which was changed to create the counterfactual statement, was not correct.

In the illustrated example, the model output verification software application 102 may generate and/or provide outputs 122 to the GUI 108 and/or, more generally, the electronic devices 106. For example, the model output verification software application 102 may generate the outputs 122 to be verification results that indicate which of one or more statements to be verified is verified or not verified. In some embodiments, the model output verification software application 102 may generate the outputs 122 to be verification results that indicate source(s) that either verify or disprove the one or more statements. In some embodiments, the model output verification software application 102 may generate the outputs 122 to indicate that the output, such as the natural language output, from the generative ML model 110 conforms to the query. For example, the model output verification software application 102 may compare the prompt and the natural language output and determine, based on the comparison, that the natural language output is responsive to the prompt. In some embodiments, the model output verification software application 102 may generate the outputs 122 to include at least one of a citation to a data source of the outputs 122 (or portion(s) thereof), a network link (e.g., a URL, an IP address) to the data source of the outputs 122 (or portion(s) thereof), or a score (e.g., a reliability score, a verification score) associated with the data source of the output. For example, the model output verification software application 102 may generate a reliability score indicative of a degree to which the data source is reliable and/or reputable. In some embodiments, the model output verification software application 102 may obtain the reliability score from another source, such as one(s) of the sources 112, one(s) of the information repositories 114, 116, etc. For example, the model output verification software application 102 may utilize the reliability score to determine a degree to which the data source is reliable.

In some embodiments, the model output verification software application 102 improves operation of the generative ML model 110. For example, the model output verification software application 102 can be used to provide feedback to the generative ML model 110 indicative of a degree to which outputs of the generative ML model 110 are accurate, responsive to prompt(s), and/or are beneficial to a user providing the prompt(s). In some embodiments, the model output verification software application 102 improves accuracy and/or, more generally, operation, of the generative ML model 110 by facilitating retraining of the generative ML model 110. For example, the generative ML model 110 can be retrained based on the feedback generated and provided by the model output verification software application 102.

Beneficially, in some embodiments, the model output verification software application 102 and/or the techniques effectuated by the model output verification software application 102 as described herein improves machine learning technology by implementing a new ML training paradigm in which ML outputs are independently attested for their veracity. In some embodiments, the model output verification software application 102 can cause periodic retraining of the generative ML model 110, such as triggering a retraining after a specific period of time since the last retraining has elapsed. In some embodiments, the model output verification software application 102 can cause aperiodic training of the generative ML model 110, such as when a threshold amount of generated feedback data has been reached and/or satisfied or when the average reliability score of the generative ML model 110 falls below a specified threshold.

FIG. 2A is a block diagram of an example implementation of the model output verification software application 102 of FIG. 1. The model output verification software application 102 of the illustrated example includes and/or implements a data interface module 210, a parsing module 220, a veracity evaluation module 230, an unverified aspect processing module 240, a results datastore 250, a results presentation module 260, and a graphical user interface module 270.

In the illustrated example of FIG. 2A, the model output verification software application 102 includes the data interface module 210 to receive and/or transmit data. In some embodiments, the data interface module 210 may receive data, such as the inputs 104 and/or the search queries of FIG. 1. For example, the data interface module 210 may receive a first output generated by the generative ML model 110 in response to the query from the electronic devices 106. In some embodiments, the first output may be audio, an image, natural language (e.g., text), and/or video. In some embodiments, the data interface module 210 may transmit and/or cause transmission of data, such as the outputs 122 and/or the search results of FIG. 1.

The model output verification software application 102 includes the parsing module 220 to parse natural language into one or more statements. For example, the parsing module 220 may execute a model to parse the first output from the generative ML model 110 into one or more verifiable statements. Non-limiting examples of the model include an NLP model (e.g., a sentence encoder) and a trained ML model. For example, the ML model may be trained to parse text into one or more constituent statements. Additionally or alternatively, the parsing module 220 may be a model (e.g., a trained ML model) and/or software (e.g., a software application, a software service) that may divide audio and/or video into one or more segments (e.g., audio clips, audio samples, audio segments, video clips, video samples, video segments). For example, the ML model may be trained to parse and/or segment audio and/or video into one or more clips, portions, segments, etc. In some embodiments, the parsing module 220 may parse a single statement and/or phrase into one or more words (e.g., keywords).

Additionally, the model output verification software application 102 may parse natural language into one or more statements using example techniques described by Charniak ("Statistical Parsing with a Context-free Grammar and Word Statistics." AAAI'97/IAAI'97 (1997): Pages 598-603), Hogenhout, et al. ("Robust Parsing Using a Hidden Markov Model." In Finite State Methods in Natural Language Processing (1998)), Chen, et al. ("A Fast and Accurate Dependency Parser using Neural Networks." Proceedings of the 2014 Conference on Empirical Methods in Natural Language Processing (EMNLP) (2014): Pages 740-750), Yang, et al. ("Strongly Incremental Constituency Parsing with Graph Neural Networks." 34th Conference on Neural Information Processing Systems (NeurIPS) (2020)), and Nguyen et al. ("Example-Based Sentence Reduction Using the Hidden Markov Model." ACM Transactions on Asian Language Information Processing (2004): Vol. 3, No. 2, Pages 146-158), all of which are incorporated by reference herein in their entireties.

One(s) of the above-referenced techniques describe parsing as the process of determining the syntactic structure of a sentence or string of words. This involves breaking down the sentence into its constituent parts and identifying their grammatical roles. The output of a parser is often a tree structure which showcases the hierarchical relationships between these parts. There are two key types of parsing: (i) constituency parsing which can involve decomposing a sentence with multiple clauses into its constituent clauses and (ii) dependency parsing where the end result is the identification of the role of each word in the sentence (e.g., the noun, verb, etc.). There are multiple techniques to parse a sentence that involve both non-ML models (e.g., top-down parsing, bottom-up parsing, chart parsing and probabilistic parsing) and ML models (e.g., neural network based). Of the non-ML approaches probabilistic parsing is often applied. In particular, Probabilistic Context-Free Grammars (PCFGs) assign probabilities to each rule in the grammar and then use these probabilities to choose the most likely parse for a sentence. Such an approach may be best suited to handle the inherent ambiguity in natural language. Neural network-based parsing has gained significant attention in recent years due to the success of deep learning techniques (e.g., recursive neural networks, graph neural networks).

The model output verification software application 102 includes the veracity evaluation module 230 to evaluate an output (e.g., audio, an image, a verifiable statement, a video) from the generative ML model 110 for its veracity. For example, the veracity evaluation module 230 may search at least one datastore accessible via at least one network (e.g., the Internet) to determine whether an output received by the data interface module 210 and/or an audio clip, statement, and/or video clip parsed by the parsing module 220 is accurate, false, or misleading. In some embodiments, the veracity evaluation module 230 may verify, using a model (e.g., a trained ML model) and first reference data accessed from the at least one first datastore accessible, the one or more verifiable statements (and/or one or more words in a set of words) to produce first verification results. In some embodiments, the veracity evaluation module 230 may access the at least one first datastore via at least one first communication network. In some embodiments, the first verification results may indicate which of the one or more verifiable statements (and/or which of the set of words) has been verified. Additionally or alternatively, the veracity evaluation module 230 may verify, using the model and the first reference data, whether one or more audio clips and/or video clips are accurate, false, unaltered, or misleading. For example, the first verification results may indicate which of the audio clips and/or video clips have been verified.

In some embodiments, the veracity evaluation module 230 may assign a metric, such as a grade or a score, to a statement (and/or set of words) based on the evaluation of the statement. For example, the grade or score may indicate that the statement (and/or set of words) is a verified, unverified, or false statement.

The model output verification software application 102 can include the unverified aspect processing module 240 to determine whether an unverified aspect, portion, and/or segment of an output may be verified. For example, the unverified aspect processing module 240 may determine whether any of the one or more unverified statements remains unverified. Additionally or alternatively, the unverified aspect processing module 240 may determine whether any of the one or more audio clips and/or the one or more video clips remain unverified.

In some embodiments, the unverified aspect processing module 240 may query the generative ML model 110 to provide a source for an unverified aspect (e.g., an unverified audio clip, an unverified video clip) such that the veracity evaluation module 230 may analyze the provided source to verify the unverified aspect. For example, the unverified aspect processing module 240 may query the generative ML model 110 with a request to provide information identifying at least one second datastore having second reference data attesting to veracity of the first output.

In some embodiments, the generative ML model 110 may provide the information identifying the at least one second datastore having the second reference data to the veracity evaluation module 230. In some embodiments, the veracity evaluation module 230 may verify, using the model (e.g., the trained ML model) and the second reference data accessed from the at least one second datastore, the at least one unverified aspect to produce second verification results. In some embodiments, the second reference data may be accessed via the at least one first communication network or via at least one second communication network.

The model output verification software application 102 includes the results datastore 250 to store data. In some embodiments, the results datastore 250 stores verified and/or unverified aspects. Non-limiting examples of verified aspects that the results datastore 250 may store include verified audio (e.g., verified audio clip(s), portion(s), sample(s), segment(s)), verified image(s), verified phrase(s) (e.g., natural language phrase(s), text phrase(s)), verified statement(s), and verified video (e.g., verified video clip(s), portion(s), sample(s), segment(s)). Non-limiting examples of unverified aspects that the results datastore 250 may store include unverified audio (e.g., unverified audio clip(s), portion(s), sample(s), segment(s)), unverified image(s), unverified phrase(s) (e.g., natural language phrase(s), text phrase(s)), unverified statement(s), and unverified video (e.g., verified video clip(s), portion(s), sample(s), segment(s)). In some embodiments, the results datastore 250 may store grade(s), score(s), and source(s) associated with the verified and/or unverified aspects.

In some embodiments, the results datastore 250 can be implemented by any technology for storing data. For example, the results datastore 250 can be implemented by a volatile memory (e.g., an SDRAM, a DRAM, an RDRAM, etc.) and/or a non-volatile memory (e.g., flash memory). The results datastore 250 may additionally or alternatively be implemented by one or more DDR memories, such as DDR, DDR2, DDR3, DDR4, mDDR, etc. The results datastore 250 may additionally or alternatively be implemented by one or more mass storage devices such as HDD(s), CD drive(s), DVD drive(s), SSD drive(s), etc. While in the illustrated example the results datastore 250 is illustrated as a single datastore, the results datastore 250 may be implemented by any number and/or type(s) of datastore. Furthermore, the data stored in the results datastore 250 may be in any data format. Non-limiting examples of data formats include audio data, binary data, comma delimited data, a flat file, image data, structured query language (SQL) structures, tab delimited data, text data, and video data.

In some embodiments, the results datastore 250 may be implemented by a database system, such as one or more databases. For example, the results datastore 250 may be implemented by an organized body of related data and may be in the form of one or more of a table, a log, a map, a grid, a packet, a datagram, a frame, a file, an e-mail, a message, a document, a report, a list or in any other form.

The model output verification software application 102 includes the results presentation module 260 to generate and/or output verification results. For example, the results presentation module 260 can assemble, compile, and/or package the evaluation results from the veracity evaluation module 230. In some embodiments, the results presentation module 260 can generate verification results to include an output (e.g., an audio clip, an image, a phrase, a statement, a video clip), an indication of whether the output is verified or unverified, a grade and/or score representative of the indication of whether the output is verified or unverified, and/or a data source used to verify and/or indicate a non-verification of the output. For example, the results presentation module 260 may provide output indicating whether one or more of the one or more verifiable statements (and/or other verifiable aspects) have been verified based on at least one of the first verification results or the second verification results.

The model output verification software application 102 can include the graphical user interface module 270 to generate and/or output a GUI including a visualization that may be presented to a user. For example, the graphical user interface module 270 may generate one or more GUI elements containing the verification results. In some embodiments, the graphical user interface module 270 may generate a plurality of visualizations. For example, the graphical user interface module 270 may generate a first visualization including the prompt to the generative ML model 110 and/or the output from the generative ML model 110. In some embodiments, the graphical user interface module 270 may generate a second visualization including the verification results. For example, the graphical user interface module 270 may generate the GUI to present the first and second visualizations for comparison such as by arranging the first and second visualizations in a side-by-side configuration or a top-and-bottom configuration for ease of review for the user. In some embodiments, the graphical user interface module 270 may store the generated GUI. In some embodiments, the graphical user interface module 270 may transmit and/or cause transmission of the generated GUI to one(s) of the electronic devices 106 for presentation on the one(s) of the electronic devices 106.

While an example implementation of the model output verification software application 102 of FIG. 1 is depicted in FIG. 2A, other implementations are contemplated. For example, one or more blocks, components, functions, etc., of the model output verification software application 102 may be combined or divided in any other way. The model output verification software application 102 of the illustrated example may be implemented by hardware alone, or by a combination of hardware, software, and/or firmware. For example, the model output verification software application 102 may be implemented by one or more analog or digital circuits (e.g., comparators, operational amplifiers, etc.), one or more hardware-implemented state machines, one or more programmable processors (e.g., central processing units (CPUs), digital signal processors (DSPs), field programmable gate arrays (FPGAs), neuromorphic processors, etc.), one or more network interfaces (e.g., network interface circuitry, network interface cards (NICs), smart NICs, etc.), one or more application specific integrated circuits (ASICs), one or more memories (e.g., non-volatile memory, volatile memory, etc.), one or more mass storage disks or devices (e.g., HDDs, SSD drives, etc.), etc., and/or any combination(s) thereof. In some embodiments, the model output verification software application 102 may be implemented by a single, physical hardware device, such as being in the same electrical enclosure, housing, etc. Alternatively, one or more portions of the model output verification software application 102 may be implemented by two or more separate physical hardware devices.

FIG. 2B is a block diagram of another example implementation of the model output verification software application 102 of FIG. 1 and/or FIG. 2A. The model output verification software application 102 of this example may be configured, instantiated, and/or executable to verify text output from the generative ML model 110 of FIG. 1. Additionally or alternatively, the model output verification software application 102 of this example may be configured, instantiated, and/or executable to verify any other output from the generative ML model 110 of FIG. 1, such as audio output, image output, and/or video output. In the illustrated example, the model output verification software application 102 of FIG. 2B includes and/or implements the data interface module 210, the parsing module 220, the veracity evaluation module 230, the unverified aspect processing module 240, the results datastore 250, and the results presentation module 260 of FIG. 2A.

The data interface module 210 of the illustrated example obtains text to be verified 211 and/or user-supplied source(s). For example, the data interface module 210 may obtain a natural language output to be verified 212, such as the inputs 104 of FIG. 1 that may include one or more verifiable words, phrases, and/or statements. For example, the natural language output to be verified 212 may be text. In some embodiments, the natural language output to be verified 212 may be included in a document and/or a file. In some embodiments, the data interface module 210 may obtain user-supplied source(s) 214, such as one(s) of the sources 112 of FIG. 1 associated with source(s) of the natural language output to be verified 212.

The data interface module 210 of this example outputs the natural language output to be verified 212 to the parsing module 220 and/or the user-supplied source(s) 214 to the veracity evaluation module 230. The parsing module 220 of this example parses the natural language output to be verified 212 into one or more individual verifiable statements 215. For example, the parsing module 220 may execute, using the natural language output to be verified 212 as input, a sentence encoder and/or any other NLP and/or ML model to generate output(s) such as the individual verifiable statements 215. Additionally or alternatively, the parsing module 220 may parse the natural language output to be verified 212 into individual verifiable words and/or phrases.

The parsing module 220 outputs and/or provides the verifiable individual statements 215 to a statement selection module 231 included in and/or implemented by the veracity evaluation module 230. The statement selection module 231 may be configured to select a verifiable statement, such as a first verifiable statement, from the individual verifiable statements 215 provided by the parsing module 220. The statement selection module 231 may output the verifiable statement and/or provide an identification of the verifiable statement to a search module 232 of the veracity evaluation module 230.

In the illustrated example, the search module 232 may be configured to generate one or more search queries 216 based on at least the selected verifiable statement. For example, the search module 232 may generate, using the selected verifiable statement and/or one or more user-supplied sources, a search string and/or any other format of search query. In some embodiments, the search module 232 may output the one or more search queries 216 to at least one network 280 via a network module 233 of the veracity evaluation module 230.

In some embodiments, the network module 233 may implement any type of communication interface, such as a cellular telephone system (e.g., a 4G LTE interface, a 5G interface, a future generation 6G interface, etc.), an Ethernet interface, an optical fiber interface, a satellite interface (e.g., a beyond-line-of-site (BLOS) satellite interface, a line-of-site (LOS) satellite interface, etc.), a Wireless Fidelity (Wi-Fi) interface, etc., and/or any combination(s) thereof. In some embodiments, the at least one network 280 may be one or more communication networks implemented by any wired and/or wireless network(s) as described herein. In some embodiments, the at least one network 280 may correspond to the at least one network 118 of FIG. 1.

In some embodiments, the search module 232 may query one or more of the information repositories 114, 116 of FIG. 1, via the network module 233, using the one or more search queries 216. In some embodiments, the search module 232 may query, via the network module 233, one or more of the user-supplied sources 214 using the one or more search queries 216.

In the illustrated example, responsive to the one or more search queries 216, the search module 232 may receive, via the network module 233, one or more search results 217. For example, the search module 232 may obtain the search results 217 from one(s) of the information repositories 114, 116 responsive to the one or more search queries 216. In some embodiments, the search module 232 may obtain the search results 217 from the one or more user-supplied sources 214 responsive to the one or more search queries 216.

In some embodiments, the search module 232 may determine whether the search results 217 indicate whether they are an exact and/or a substantial match to the verifiable statement. For example, the search module 232 may execute a model (e.g., an ML model, an NLP model) using the verifiable statement and the search results as input to generate output(s), which may include a determination, an identification, and/or a prediction of a degree to which the verifiable statement may be identified and/or included in the search results 217. In some embodiments, the search module 232 may determine that the search results are and/or provide for an exact match of the verifiable statement. For example, the search module 232 may determine that the search results 217 include the same and/or exact arrangement of words in the verifiable statement. In some embodiments, the search module 232 may determine that the search results 217 include substantially the same arrangement of words in the verifiable statement. For example, the search module 232 may determine that the search results 217 omit and/or are missing one or more words of the verifiable statement that do not change the semantic meaning of the search results 217. In some embodiments, the search module 232 may determine that the search results 217 include one or more additional words that do not change the semantic meaning of the search results 217. In the illustrated example, the search module 232 outputs an indication of an exact match and/or a substantial match 218 to a verification score module 234 included in and/or implemented by the veracity evaluation module 230.

In some embodiments, the search module 232 may determine that the search results 217 are not an exact and/or a substantial match to the verifiable statement. For example, the search module 232 may determine that the search results 217 do not include the same and/or exact arrangement of words in the verifiable statement. In some embodiments, the search module 232 may determine that the search results 217 do not include substantially the same arrangement of words in the verifiable statement. For example, the search module 232 may determine that the search results 217 omit and/or are missing one or more words of the verifiable statement that change the semantic meaning of the search results 217. In some embodiments, the search module 232 may determine that the search results 217 include one or more additional words that change the semantic meaning of the search results 217. In the illustrated example, the search module 232 outputs an indication of a non-exact and/or non-substantial match 219 to a statement comprehension module 236 included in and/or implemented by the veracity evaluation module 230.

The veracity evaluation module 230 includes the statement comprehension module 236 to analyze, evaluate, and/or comprehend the search results 217 and/or, more generally, the source(s) that returned the search results 217. For example, the statement comprehension module 236 may be configured to determine whether the first verifiable statement of the one or more verifiable statements at least partially matches the search results 217, or portion(s) thereof. In some such embodiments, the statement comprehension module 236 may execute the model using the first verifiable statement and at least one portion of the search results 217 as input to generate output(s) representing that a first semantic meaning of the first verifiable statement corresponds to a second semantic meaning of the at least one portion of the search results 217. In some such embodiments, the statement comprehension module 236 may determine that the search results 217, or portion(s) thereof, are a near match and/or a near substantial match to the first verifiable statement because although they may not be exact literal word-for-word matches to each other, they may nevertheless have similar and/or substantially matching semantic meanings. The statement comprehension module 236 of the shown example may output an indication of a near and/or a near substantial match to the verification score module 234.

Semantic similarity, or determining how similar the meanings of two sentences are, can be approached through multiple methods such as vector space models (VSM), word embedding s (e.g., Word2Vec), neural network models (e.g., Siamese networks, triplet networks) and transformers (e.g., BERT). Transformer-based models are considered state of the art but are computationally very inefficient. Modifications of transformer models that use Siamese and triplet network structures to measure semantic meanings of sentences can retain much of the accuracy of full transformer models but reduce the computation time by several orders of magnitude. Multiple metrics exist to measure the similarity between two sentences, including: cosine similarity, soft cosine similarity, feature-based measures, Jaccard similarity, Jensen Shannon Distance, and Euclidean distance.

Additionally, the veracity evaluation module 230 and/or, more generally, the model output verification software application 102, may determine a degree to which two verifiable aspects have the same semantic meaning using example techniques described by Sitikhu et al. ("A Comparison of Semantic Similarity Methods for Maximum Human Interpretability." 2019 Artificial Intelligence for Transforming Business and Society (AITB) (2019): Pages 1-4), Sravanthi, et al. ("Semantic Similarity Between Sentences." International Research Journal of Engineering and Technology (IRJET) (2017): Volume 04, Issue 01, Pages 156-161), Sunilkumar P, et al. ("A Survey on Semantic Similarity." 2019 International Conference on Advances in Computing, Communication and Control (ICAC3) (2019)), Thabet Slimani ("Description and Evaluation of Semantic similarity Measures Approaches." International Journal of Computer Applications (2013) 80(10): Pages 25-33), and Reimers et al. ("Sentence-BERT: Sentence Embeddings using Siamese BERT-Networks." Proceedings of the 2019 Conference on Empirical Methods in Natural Language Processing and the 9th International joint Conference on Natural Language Processing (2019): Pages 3982-3992), all of which are incorporated by reference herein in their entireties. For example, Sitikhu describes three different techniques of calculating semantic similarity. It not only focuses on the text's words but also incorporates semantic information of texts in their feature vector and computes semantic similarities. These techniques are based on corpus-based and knowledge-based techniques, which are: cosine similarity using tf-idf vectors, cosine similarity using word embedding and soft cosine similarity using word embedding. For example, the verification score module 234 may utilize one(s) of these techniques, such as cosine similarity using tf-idf vectors, to determine a degree to which two verifiable aspects have the same semantic meaning.

In some embodiments, the search module 232, the statement comprehension module 236, and/or, more generally, the veracity evaluation module 230, may implement machine reading comprehension to ingest, evaluate, and/or comprehend natural language of the search results 217. Machine reading comprehension (MRC) refers to the ability of a machine to read, understand, and then answer questions about a given text. Two example techniques in use today are: (i) neural network models and (ii) more recently, pre-trained language models. The performance of MRC is measured by metrics such as: (i) exact match (i.e., the percentage of answers that exactly match the correct response) and (ii) F1 score, a harmonic mean of precision and recall. Additionally, the search module 232, the statement comprehension module 236, and/or, more generally, the veracity evaluation module 230, may effectuate and/or perform machine reading comprehension using example techniques described by Sravanthi, et al. ("Semantic Similarity Between Sentences." International Research Journal of Engineering and Technology (IRJET) (2017): Volume 04, Issue 01, Pages 156-161), Sunilkumar P, et al. ("A Survey on Semantic Similarity." 2019 International Conference on Advances in Computing, Communication and Control (ICAC3) (2019)), Rajpurkar et al. ("Know What You Don't Know: Unanswerable Questions for SQuAD." Proceedings of the 56th Annual Meeting of the Association for Computational Linguistics (2018): Pages 784-789), Zhang et al. ("Neural Machine Reading Comprehension: Methods and Trends." Appl. Sci. 2019, 9(18), 3698), Thabet Slimani ("Description and Evaluation of Semantic similarity Measures Approaches." International Journal of Computer Applications (2013) 80(10): Pages 25-33), and Zhang, et al. ("Machine Reading Comprehension: The Role of Contextualized Language Models and Beyond." Proceedings of the 33rd Conference on Computational Linguistics and Speech Processing (ROCLING) (2021): Pages 48-57), all of which are incorporated by reference herein in their entireties. For example, the search module 232, the statement comprehension module 236, and/or, more generally, the veracity evaluation module 230, may utilize one(s) of these techniques to ingest, evaluate, and/or comprehend natural language of the search results 217.

In the illustrated example, the verification score module 234 may assign a score (e.g., a veracity score, a verification score) to an aspect of an output to be verified. For example, the verification score module 234 may, based on the indication from the search module 232 that the first verifiable statement matches and/or substantially matches the search result(s), determine and/or generate a verification score in accordance with the first verifiable statement substantially matching the search results 217. In some such embodiments, the verification score module 234 may store the verification score, the first verifiable statement, and/or data association(s) of the verification score and the first verifiable statement in the results datastore 250.

In some embodiments, the verification score module 234 may, based on the indication from the search module 232 that the first verifiable statement nearly matches and/or substantially nearly matches the search results 217, determine and/or generate a verification score in accordance with the first verifiable statement nearly matching the search result(s). In some such embodiments, the verification score module 234 may store the verification score, the first verifiable statement, and/or data association(s) of the verification score and the first verifiable statement in the results datastore 250.

In some embodiments, the verification score module 234 may, based on the indication from the search module 232 that the first verifiable statement does not match and/or nearly match the search results 217, determine and/or generate a verification score in accordance with the first verifiable statement not matching and/or nearly matching the search results 217. In some such embodiments, the verification score module 234 may store the verification score, the first verifiable statement, and/or data association(s) of the verification score and the first verifiable statement in the results datastore 250. In some embodiments, the verification score module 234 may store one or more verified statements and/or one or more unverified statements 221 in the results datastore 250.

In some embodiments, the verification score module 234 may determine and/or generate a score, such as a reliability score, indicative of a degree to which a model that provided an output, such as the natural language output to be verified 212, is likely to generate verified output(s). For example, the verification score module 234 may assign a score to the generative ML model 110 indicative of that the generative ML model 110 is reliable to generate outputs with a relatively high likelihood of the outputs being verified and/or otherwise conforming with truth, fact, and/or accuracy. In some such embodiments, the verification score module 234 may increase (e.g., iteratively increase) a reliability score of the generative ML model 110 as the verification score module 234 determines that subsequently generated outputs of the generative ML model 110 are verified. In some embodiments, the verification score module 234 may assign a score to the generative ML model 110 indicative of that the generative ML model 110 is not reliable to generate outputs with a relatively high likelihood of the outputs being verified and/or otherwise conforming with truth, fact, and/or accuracy. In some such embodiments, the verification score module 234 may decrease (e.g., iteratively decrease) a reliability score of the generative ML model 110 as the verification score module 234 determines that subsequently generated outputs of the generative ML model 110 are unable to be verified and/or are disproved.

In some embodiments, a score (e.g., a verification score, a veracity score) assigned to a verifiable aspect (e.g., a verifiable audio sample, a verifiable image and/or cropped version thereof, a verifiable phrase, a verifiable statement, a verifiable video sample) may represent a degree to which the verifiable aspect is verified. In some embodiments, the score may be a numerical value in a numerical value range. For example, a score of 100 in a range of 0 to 100 may indicate that the verifiable aspect is verified, such as identifying an exact and/or a substantial match of the verifiable aspect in the search results 217 and/or one or more user-supplied sources 214. In some embodiments, a score of 10 in a range of 0 to 100 may indicate that the verifiable aspect is not verified, such as not identifying an exact match, a substantial match, and/or a near match of the verifiable aspect in the search results 217 and/or one or more user-supplied sources 214. The aforementioned values are merely exemplary and any other score values and/or score value ranges are contemplated. Additionally or alternatively, the verification score module 234 may assign a grade, a rating (e.g., a numerical rating, a text-based rating such as "verified", "partially verified", or "not verified"), or any other metric and/or any combination(s) thereof.

As discussed above, the verification score module 234 may store at least one of a verifiable aspect, a score associated thereof, and/or data association(s) of the verifiable aspect and the score in the results datastore 250. In the illustrated example, the verification score module 234 may output a verifiable aspect, such as a verified and/or unverified statement, to a counterfactual generation module 238 included in and/or implemented by the veracity evaluation module 230.

In some embodiments, the counterfactual generation module 238 may alter, change, and/or modify a meaning (e.g., a lexical meaning, a semantic meaning) of an output of the generative ML model 110 to attest its veracity. In some embodiments, generating a counterfactual of a given sentence involves expressing the sentence in a manner that is contrary to the statement made in the first sentence. Two example techniques to generating contrafactual sentences are: (i) mechanically stating the opposite of the sentence by inserting the word "not" in the appropriate place (e.g., "The dog is brown" to "The dog is not brown") and (ii) and using frameworks that leverage LLMs. In the first example technique, each verifiable statement will have been parsed and accordingly obtaining the contrafactual by inserting the word "not" in the appropriate is a computationally efficient and effective method. In some instances, where it is not possible or not desired to generate a counterfactual in this way, one can use frameworks such as the GYC framework. The benefit of GYC is that it generates counterfactual samples that satisfy all of the following conditions: plausible, diverse, goal-oriented and effective. Additionally, the counterfactual generation module 238 may generate a counterfactual verifiable aspect by implementing the GYC framework described by Madaan et al. ("Generate Your Counterfactuals: Towards Controlled Counterfactual Generation for Text." AAAI Conference on Artificial Intelligence (2020)), which is incorporated by reference herein in its entirety. Madaan describes generating a set of counterfactual text samples, which are useful for testing ML systems. Madaan describes GYC, a framework to generate counterfactual samples such that the generation is plausible, diverse, goal-oriented and effective and which can direct the generation towards a corresponding condition such as named-entity tag, semantic role label, or sentiment. An alternative framework is that of Polyjuice, a general-purpose counterfactual generator that produces diverse sets of realistic counterfactuals. For example, the counterfactual generation module 238 may generate a counterfactual verifiable aspect by implementing the Polyjuice framework described by Wu et al. ("POLYJUICE: Generating Counterfactuals for Explaining, Evaluating, and Improving Models." Proceedings of the 59th Annual Meeting of the Association for Computational Linguistics and the 11th International Joint Conference on Natural Language Processing (2021) (Volume 1: Long Papers): Pages 6707-6723), which is incorporated by reference herein in its entirety. Additionally, the counterfactual generation module 238 may generate and/or evaluate counterfactuals by using example techniques described by Li et al. ("Large Language Models as Counterfactual Generator: Strengths and Weaknesses." (2023) ArXiv, abs/2305.14791) and Paranjape et al. ("Retrieval-guided Counterfactual Generation for QA." Proceedings of the $60^{th}$ Annual Meeting of the Association for Computational Linguistics (2022) (Volume 1: Long Papers): Pages 1670-1686)), each of which are incorporated by reference herein in their entireties. For example, Paranjape describes creating counterfactuals for question answering, which presents unique challenges related to world knowledge, semantic diversity, and answerability. Paranjape describes the development of a Retrieve-Generate Filter (RGF) technique to create counterfactual evaluation and training data with minimal human supervision to address these challenges.

By way of example, the counterfactual generation module 238 may insert the word "not" in a parsed sentence to generate a counterfactual statement. By way of example, the counterfactual generation module 238 may receive a verified (or unverified statement) from the verification score module 234. In some such embodiments, the counterfactual generation module 238 may receive the verified statement of "The Eiffel Tower is the tallest structure in the City of Paris," which was verified by the search module 232 using the search results. To attest the veracity of the verified statement, the counterfactual generation module 238 may generate a counterfactual statement of "The Eiffel Tower is not the tallest structure in the City of Paris." Responsive to the generation, the counterfactual generation module 238 may provide the counterfactual statement to the statement selection module 231 to attest its veracity in the same manner as described above. For example, the statement selection module 231 may provide the counterfactual statement to the search module 232 to generate one or more search queries and evaluate search result(s) responsive to the one or more search queries 216. The search module 232 may determine whether the search results 217 are and/or include an exact or substantial match, a near match or substantially near match, etc.

In some embodiments, the counterfactual generation module 238 may determine that the verified statement of "The Eiffel Tower is the tallest structure in the City of Paris." is accurate based on determining that the search results 217 did not disprove the verified statement. Alternatively, the counterfactual generation module 238 may determine that the verified statement is inaccurate and/or not verified based on determining that the search results 217 disproved and/or has a meaning that is different from the verified statement.

However, the counterfactual generation module 238 and/or, more generally, the veracity evaluation module 230, is not so limited to attesting an output aspect using counterfactual statement(s) and may also encompass attesting an output aspect using related statement(s) to the output aspect that may vary in degree to which the related statement(s) is/are different in semantic understanding to the model output. In addition, the counterfactual generation module 238 and/or, more generally, the veracity evaluation module 230, is not so limited to generate counterfactual statements that are opposite in semantic meaning to an output aspect and may also encompass generating counterfactual statements that have varying degrees of differences in semantic meaning to the output aspect.

In the illustrated example, the results datastore 250 can output one or more unverified statements 222 to the unverified aspect processing module 240. For example, the unverified aspect processing module 240 may be configured to verify one or more aspects that were unable to be verified by the veracity evaluation module 230. In some embodiments, the unverified aspect processing module 240 may query, via the data interface module 210, the generative ML model 110 with a request to provide information identifying at least one datastore having reference data attesting to veracity of the unverified statement(s) 222. For example, the unverified aspect processing module 240 may generate the request to identify other source(s) of information that the veracity evaluation module 230 may not have identified to verify the unverified statement(s) 222.

In some embodiments, the data interface module 210 may request data from the generative ML model 110 via an API. APIs are commonly used with ML models as demonstrated by the scikit-learn ML library used with python (a language often used for data mining and ML) that enables both experts and non-experts to use the relevant ML models. One particular API that is designed specifically for ML models is the DEEPaaS API that leverages the Representational State Transfer (REST) architectural style and allows for interactions with web services. ML models can be integrated with the DEEPaaS API with minimal requirements and modifications. The benefit of using a DEEPaaS API is that it allows the exposing of all required model functionality over a network (i.e., as a service). Additionally, the data interface module 210 may interface with an ML model via at least one API using example techniques described by Garcia et al. ("DEEPaaS API: a REST API for Machine Learning and Deep Learning models." Journal of Open Source Software (2019), 4(42), 1517) and Buitinck et al. ("API design for machine learning software: experiences from the scikit-learn project." European Conference on Machine Learning and Principles and Practices of Knowledge Discovery in Databases (2013)), all of which are incorporated by reference herein in their entireties. For example, the data interface module 210 may utilize one(s) of the aforementioned techniques to transmit data to and/or receive data from the generative ML model 110.

In the illustrated example, the data interface module 210 obtains output(s) from the generative ML model 110. For example, the data interface module 210 may obtain first output(s) such as an indication from the generative ML model 110 that an unverified statement is verified and with source(s) 223 to which the generative ML model 110 may have used to verify the unverified statement. In some embodiments, the data interface module 210 may obtain second output(s) such as an indication from the generative ML model 110 that an unverified statement is verified and without source(s) 225.

The data interface module 210 of the shown example outputs the verified statement(s) from the generative ML model 110 and/or source(s) provided by the generative ML model 110 to the unverified aspect processing module 240. The unverified aspect processing module 240 of the illustrated example may output the verified statements (identified by ML verified statements) to the statement selection module 231 and/or the source(s) (identified by ML supplied source(s)) to the search module 232. For example, the veracity evaluation module 230 may attest a veracity of the verified statements using the source(s), other source(s) identified by the search module 232, and/or any combination(s) thereof. In some such embodiments, the veracity evaluation module 230 may generate the search queries 216, evaluate and/or comprehend the search results 217, and/or assign a verification score to the verified statements 227 received from the generative ML model 110 and output from the unverified aspect processing module 240.

In the illustrated example, the results datastore 250 outputs aspect evaluation(s) 229, such as statement evaluation(s) to the results presentation module 260. For example, the results datastore 250 may store evaluation(s) of aspect(s), such as score(s) assigned to verifiable aspects. In some embodiments, the results presentation module 260 may assemble, compile, and/or package evaluation results, such as the statement evaluations, from the veracity evaluation module 230 and/or the results datastore 250. In some embodiments, the results presentation module 260 can generate verification results 241 to include an output (and/or output aspect) (e.g., an audio clip, an image, a phrase, a statement, a video clip), an indication of whether the output is verified or unverified, a score representative of a degree to which the output is verified or unverified, and/or source(s) used to verify and/or indicate a non-verification of the output. For example, the results presentation module 260 may provide output indicating whether one or more of the one or more verifiable statements (and/or other verifiable aspects) have been verified based on at least one of the first verification results or the second verification results.

In the illustrated example, the results presentation module 260 may output the verification result(s) 241 via an application programming interface (API) 290. For example, one(s) of the electronic devices 106 of FIG. 1 may access the verification result(s) 241 via the API 290. Additionally or alternatively, any other computing system may access the verification result(s) 241 via the API 290.

In the illustrated example, the results presentation module 260 may output the verification result(s) 241 to the graphical user interface module 270. In some embodiments, the graphical user interface module 270 may generate at least one GUI including at least one visualization for presentation of the verification result(s) 241. For example, the graphical user interface module 270 may generate the at least one GUI to include at least one GUI element containing an output (and/or output aspect) (e.g., an audio clip, an image, a phrase, a statement, a video clip). In some embodiments, the graphical user interface module 270 may generate the at least one GUI to include at least one GUI element containing information about whether the output (and/or output aspect) is verified or unverified. In some embodiments, the graphical user interface module 270 may generate the at least one GUI to include at least one GUI element containing a score representative of a degree to which the output is verified or unverified, and/or source(s) used to verify and/or indicate a non-verification of the output.

FIGS. 3-6 are flowcharts representative of example processes to be performed and/or example machine-readable instructions that may be executed by processor circuitry to implement the model output verification software application 102 of FIGS. 1, 2A, and/or 2B. Additionally or alternatively, block(s) of one(s) of the flowcharts of FIGS. 3, 4, 5, and/or 6 may be representative of state(s) of one or more hardware-implemented state machines, algorithm(s) that may be implemented by hardware alone such as an ASIC, etc., and/or any combination(s) thereof.

Figure 3:
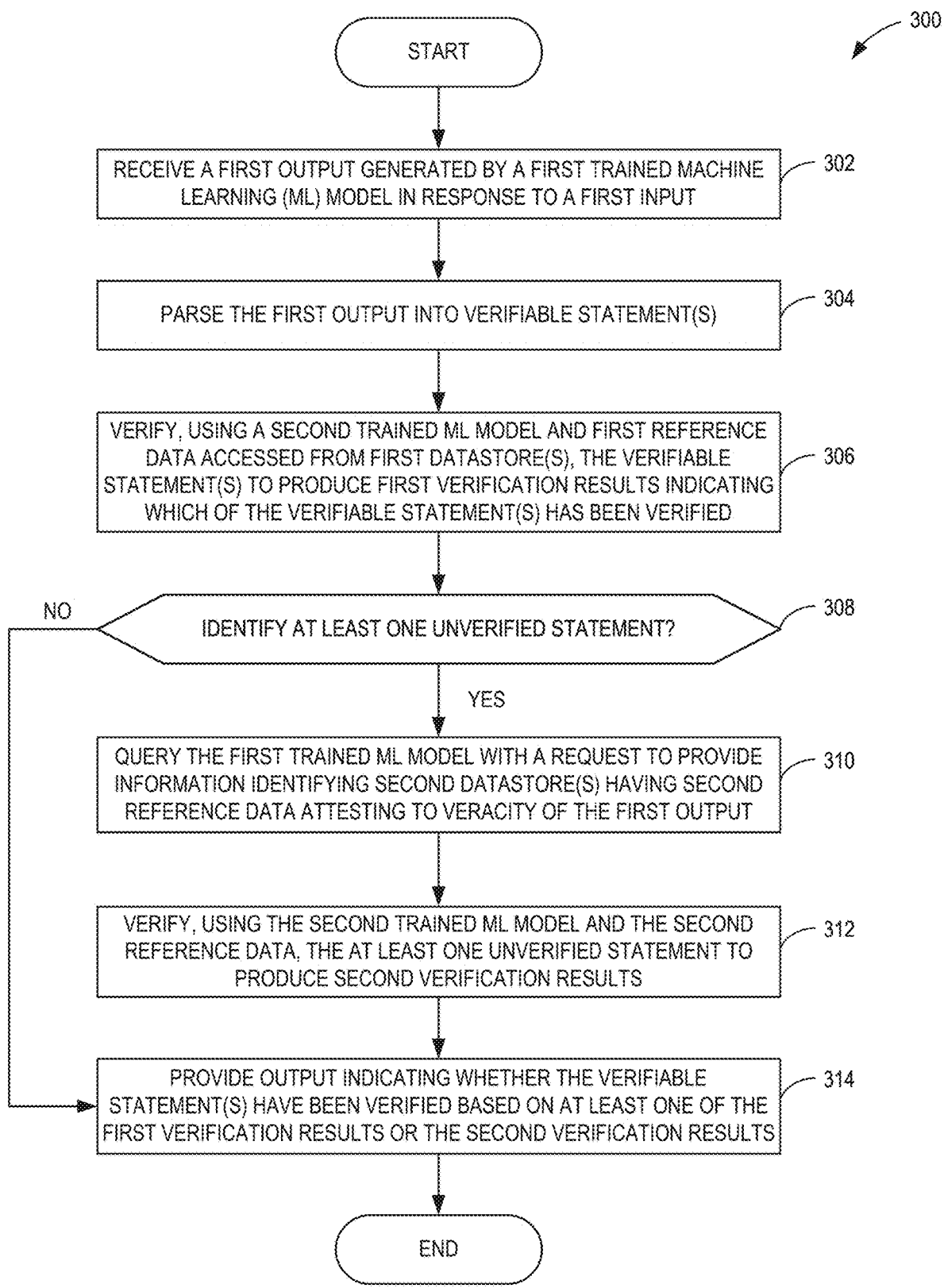
FIG. 3 is a flowchart representative of example machine-readable instructions that may be executed by processor circuitry to implement the model output verification software application of FIGS. 1, 2A, and/or 2B to provide output indicating whether a verifiable statement has been verified, according to some embodiments.

FIG. 3 is a flowchart 300 representative of an example process that may be performed and/or implemented using hardware logic and/or example machine-readable instructions that may be executed by processor circuitry to implement the model output verification software application 102 of FIGS. 1, 2A, and/or 2B to provide output indicating whether a verifiable statement has been verified. The flowchart 300 of FIG. 3 begins at block 302, at which the model output verification software application 102 may receive a first output generated by a trained machine learning (ML) model in response to a first input. For example, the generative ML model 110 of FIG. 1 may generate an output, such as a text output, in response to a query (e.g., a prompt) from one(s) of the electronic devices 106 of FIG. 1. In some such embodiments, the data interface module 210 of FIGS. 2A and/or 2B may receive the inputs 104 of FIG. 1, which may be representative of at least the output from the generative ML model 110, as aspects (e.g., audio, imagery, text, video) to be verified. For example, the data interface module 210 may receive text to be verified and output the text to be verified to the parsing module 220.

At block 304, the model output verification software application 102 may parse the first output into verifiable statement(s). For example, the parsing module 220 may parse the text to be verified into individual verifiable statements, phrases, and/or words. In some embodiments, the parsing module 220 may parse the text to be verified using a first model trained to identify constituent statements in text.

At block 306, the model output verification software application 102 may verify, using a second trained ML model and first reference data accessed from first datastore(s), the verifiable statement(s) to produce first verification results indicating which of the verifiable statement(s) has been verified. For example, the statement selection module 231 may select one of the individual verifiable statements to process and the search module 232 may query one(s) of the information repositories 114, 116 of FIG. 1 using at least one search query, which the search module 232 may generate based the selected verifiable statement. In some embodiments, the search module 232 may execute a model, such as a trained ML model, using the selected verifiable statement and the search results as input to generate output(s), which may include an indication of a degree to which the search results match the selected verifiable statement. In some embodiments, the verification score module 234 may assign a score in accordance with the degree to which the search results match the selected verifiable statement. In some embodiments, the verification score module 234 and/or, more generally, the veracity evaluation module 230, may generate and/or store verification results in the results datastore 250. In some such embodiments, the verification results may include the selected verifiable statement, the at least one search query, portion(s) of the search results, the score, and/or data associations of any combination(s) thereof.

At block 308, the model output verification software application 102 may determine whether at least one unverified statement is identified. For example, the verification score module 234 may identify at least one of the individual verifiable statements from the parsing module 220 is unverified.

If, at block 308, the model output verification software application 102 determines that at least one unverified statement is not identified, control proceeds to block 314. Otherwise, control proceeds to block 310.

At block 310, the model output verification software application 102 may query the first trained ML model with a request to provide information identifying second datastore(s) having second reference data attesting to veracity of the first output. For example, the unverified aspect processing module 240 may obtain at least one unverified statement from the results datastore 250. In some such embodiments, the unverified aspect processing module 240 may query, via the data interface module 210, the generative ML model 110 for identification(s) of source(s) to which the unverified statement may be verified.

At block 312, the model output verification software application 102 may verify, using the second trained ML model and the second reference data, the at least one unverified statement to produce second verification results. For example, the unverified aspect processing module 240 may obtain, via the data interface module 210, the identification of source(s) from the generative ML model 110. In some such embodiments, the search module 232 may evaluate a veracity of the unverified statement by analyzing and/or evaluating information contained in the identified source(s). In some such embodiments, the search module 232 may output an indication of whether the unverified statement is verified or unverified based on the source(s) provided by the generative ML model 110.

At block 314, the model output verification software application 102 may provide output indicating whether the verifiable statement(s) have been verified based on at least one of the first verification results or the second verification results. For example, the results presentation module 260 may generate verification results. In some embodiments, the results presentation module 260 may generate first verification results based on evaluation(s) of the text to be verified and/or user-supplied sources. In some embodiments, the results presentation module 260 may generate second verification results based on evaluation(s) of unverified statement(s) identified by the veracity evaluation module 230 and/or source(s) provided by the generative ML model 110. In some embodiments, the results presentation module 260 may provide output indicating whether the verifiable statement(s) have been verified based on first verification results, the second verification results, and/or any combination(s) thereof. For example, the results presentation module 260 may provide output to the graphical user interface module 270 for which the graphical user interface module 270 may generate at least one GUI including at least one visualization that presents the output indicating whether the verifiable statement(s) have been verified. After the output is provided at block 314, the flowchart 300 of FIG. 3 concludes.

Figure 4:
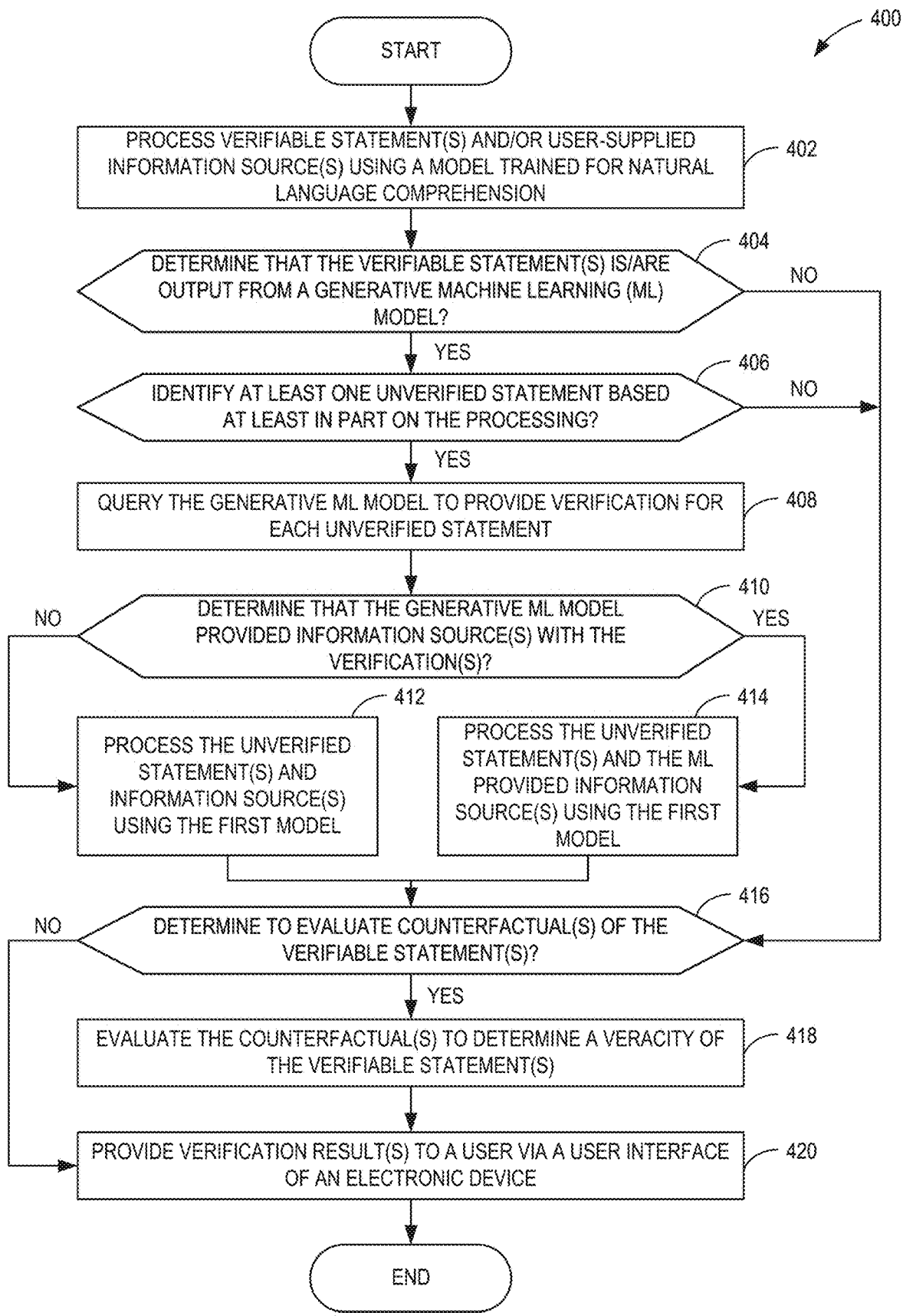
FIG. 4 is a flowchart representative of example machine-readable instructions that may be executed by processor circuitry to implement the model output verification software application of FIGS. 1, 2A, and/or 2B to provide verification results to a user, according to some embodiments.

FIG. 4 is a flowchart 400 representative of an example process that may be performed and/or implemented using hardware logic and/or example machine-readable instructions that may be executed by processor circuitry to implement the model output verification software application 102 of FIGS. 1, 2A, and/or 2B to provide verification results to a user. The flowchart 400 of FIG. 4 begins at block 402, at which the model output verification software application 102 may process verifiable statement(s) and/or user-supplied information source(s) using a model trained for natural language comprehension. For example, the data interface module 210 may obtain text to be verified and/or user-supplied source(s) from one(s) of the electronic devices 106. In some such embodiments, the parsing module 220 may parse the text to be verified into one or more individual verifiable statements.

At block 404, the model output verification software application 102 may determine whether the verifiable statement(s) is/are output from a generative machine learning (ML) model. For example, the parsing module 220 may determine, based on the information received from the one(s) of the electronic devices 106, that the individual verifiable statement(s) is/are generated from the generative ML model 110 of FIG. 1. In some embodiments, the parsing module 220 may determine, based on the information received from the one(s) of the electronic devices 106, that the individual verifiable statement(s) is/are not generated from the generative ML model 110 of FIG. 1. For example, the parsing module 220 may determine that the individual verifiable statement(s) is/are from a user-supplied source, such as one of the sources 112 of FIG. 1.

If, at block 404, the model output verification software application 102 determines that the verifiable statement(s) is/are not output from a generative ML model, control proceeds to block 416. Otherwise, control proceeds to block 406.

At block 406, the model output verification software application 102 may determine whether at least one unverified statement is identified based at least in part on the processing. For example, the verification score module 234 and/or, more generally, the veracity evaluation module 230, may determine that at least one of the individual verifiable statements is not verified.

If, at block 406, the model output verification software application 102 determines that at least one unverified statement is not identified based at least in part on the processing, control proceeds to block 416. Otherwise, control proceeds to block 408.

At block 408, the model output verification software application 102 may query the generative ML model to provide verification for each unverified statement. For example, the unverified aspect processing module 240 may cause a query to be provided to the generative ML model 110 for a verification of each unverified statement and/or source(s) that may be used to verify each unverified statement.

At block 410, the model output verification software application 102 may determine whether the generative ML model provided information source(s) with the verification(s). For example, the unverified aspect processing module 240 may determine that the generative ML model 110 provided output(s) indicating that each unverified statement is verified and included at least one source to support its determination of each verification.

If, at block 410, the model output verification software application 102 determines that the generative ML model did not provide information source(s) with the verification(s), control proceeds to block 412. At block 412, the model output verification software application 102 may process the unverified statement(s) and information source(s) using the first model. For example, the search module 232 may identify one(s) of the information repositories 114, 116 of FIG. 1 from which to process the unverified statement(s) for verification.

If, at block 410, the model output verification software application 102 determines that the generative ML model provided information source(s) with the verification(s), control proceeds to block 414. At block 414, the model output verification software application 102 may process the unverified statement(s) and the ML provided information source(s) using the first model. For example, the search module 232 may analyze, evaluate, and/or search the source(s) provided by the generative ML model 110 to process the unverified statement(s) for verification.

At block 416, the model output verification software application 102 may determine whether to evaluate counterfactual(s) of the verifiable statement(s). If, at block 416, the model output verification software application 102 determines not to evaluate counterfactual(s) of the verifiable statement(s), control proceeds to block 420. Otherwise, control proceeds to block 418.

At block 418, the model output verification software application 102 may evaluate the counterfactual(s) to determine a veracity of the verifiable statement(s). For example, the counterfactual generation module 238 may generate counterfactual statement(s) (and/or related statement(s)) to the verifiable statement(s) to attest their veracity. In some such embodiments, the search module 232 may analyze, evaluate, and/or search one(s) of the information repositories 114, 116 to verify the counterfactual(s). In some such embodiments, the verification score module 234 may output an indication representing a degree to which the counterfactual(s) and, correspondingly the verifiable statement(s), is/are true or false.

At block 420, the model output verification software application 102 may provide verification result(s) to a user via a user interface of an electronic device. For example, the results presentation module 260 may generate verification result(s) based on output(s) from the veracity evaluation module 230. In some embodiments, the results presentation module 260 may output the verification result(s) to the graphical user interface module 270, which may generate at least one GUI to display and/or present the verification result(s). In some embodiments, the at least one GUI may be presented on one(s) of the electronic devices 106 that provided the output(s) from the generative ML model 110 to be verified. Additionally or alternatively, the results presentation module 260 may enable and/or configure the verification results to be accessible via the API 290. After providing the verification result(s) at block 420, the flowchart 400 of FIG. 4 concludes.

Figure 5:
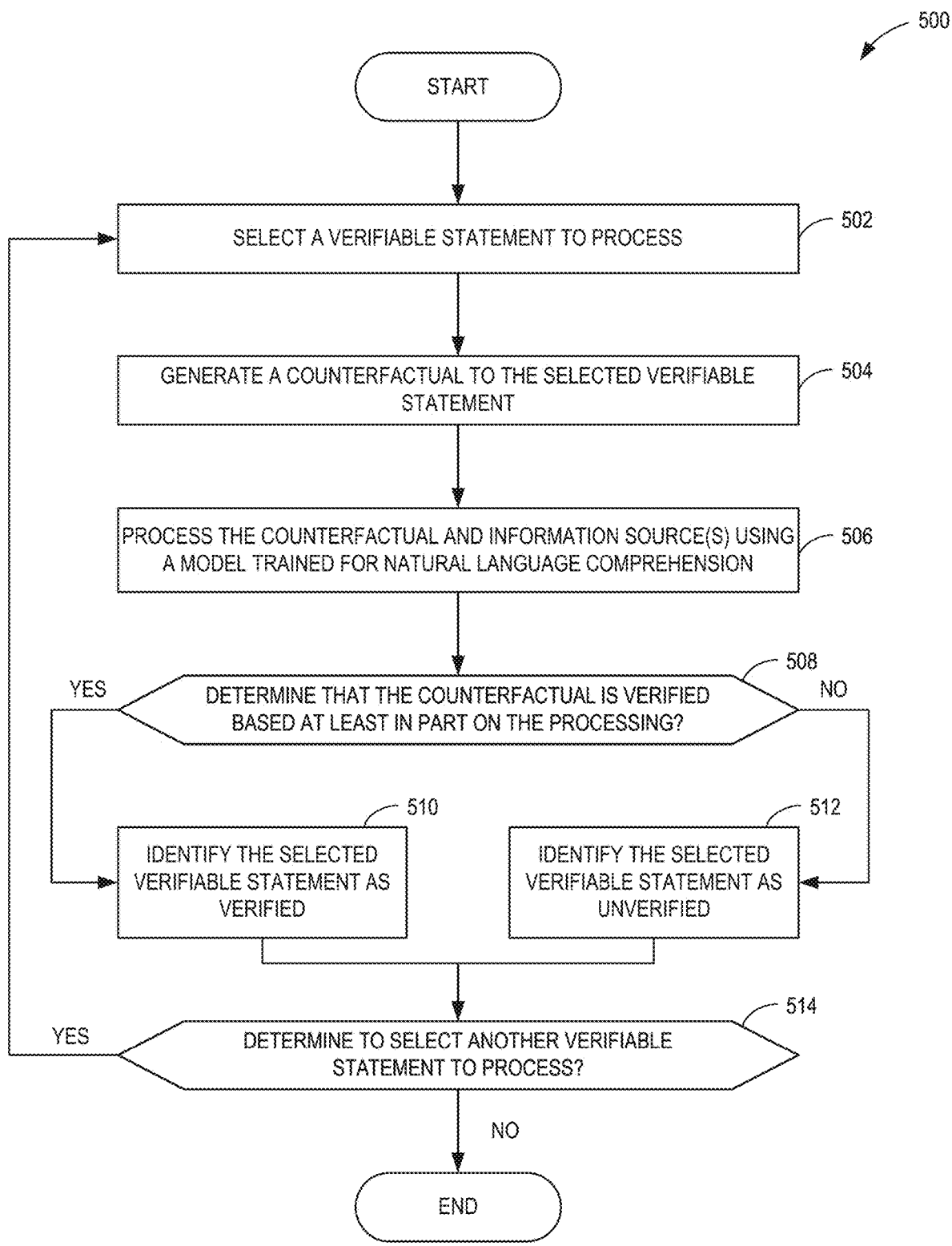
FIG. 5 is a flowchart representative of example machine-readable instructions that may be executed by processor circuitry to implement the model output verification software application of FIGS. 1, 2A, and/or 2B to verify a verifiable statement using a counterfactual, according to some embodiments.

FIG. 5 is a flowchart 500 representative of an example process that may be performed and/or implemented using hardware logic and/or example machine-readable instructions that may be executed by processor circuitry to implement the model output verification software application 102 of FIGS. 1, 2A, and/or 2B to verify a verifiable statement using a counterfactual. The flowchart 500 of FIG. 5 begins at block 502, at which the model output verification software application 102 may select a verifiable statement to process. For example, the counterfactual generation module 238 may select one of the verified or unverified statements output from the verification score module 234.

At block 504, the model output verification software application 102 may generate a counterfactual to the selected verifiable statement. For example, the counterfactual generation module 238 may generate a counterfactual statement corresponding to the selected verified or unverified statement.

At block 506, the model output verification software application 102 may process the counterfactual and information source(s) using a model trained for natural language comprehension. For example, the search module 232 and/or the statement comprehension module 236 may execute a model using the counterfactual statement as input to generate output(s), which may include an indication of a degree to which the counterfactual statement is verified.

At block 508, the model output verification software application 102 may determine whether the counterfactual is verified based at least in part on the processing. For example, the search module 232 and/or the statement comprehension module 236 may determine that the output(s) from the model indicate that the counterfactual statement is either verified or not verified.

If, at block 508, the model output verification software application 102 determines that the counterfactual is verified based at least in part on the processing, control proceeds to block 510. At block 510, the model output verification software application 102 may identify the selected verifiable statement as verified. For example, the verification score module 234 may determine that the counterfactual statement is verified based on the processing, which indicates that the verified or unverified statement is inaccurate.

If, at block 508, the model output verification software application 102 determines that the counterfactual is not verified based at least in part on the processing, control proceeds to block 512. At block 512, the model output verification software application 102 may identify the selected verifiable statement as unverified. For example, the verification score module 234 may determine that the counterfactual statement is not verified based on the processing, which indicates that the verified or unverified statement is accurate.

After the identification of the selected verifiable statement at either block 510 or 512, control proceeds to block 514. At block 514, the model output verification software application 102 may determine whether to select another verifiable statement to process. For example, the counterfactual generation module 238 may select another one of the verified or unverified statements output from the verification score module 234 to process.

If, at block 514, the model output verification software application 102 determines to select another verifiable statement to process, control returns to block 502. Otherwise, the flowchart 500 of FIG. 5 concludes.

Figure 6:
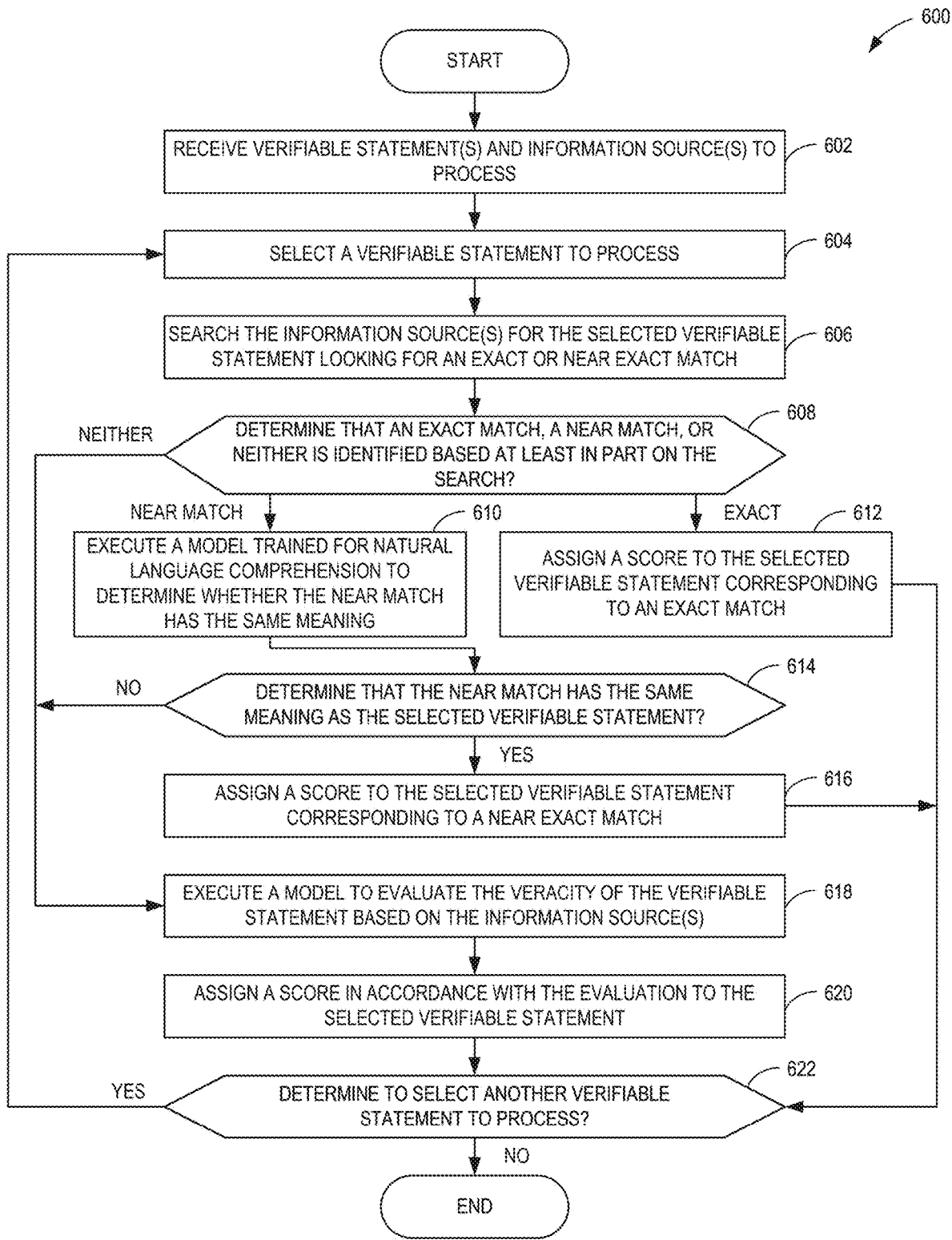
FIG. 6 is a flowchart representative of example machine-readable instructions that may be executed by processor circuitry to implement the model output verification software application of FIGS. 1, 2A, and/or 2B to assign a score to a verifiable statement in accordance with an evaluation of the verifiable statement, according to some embodiments.

FIG. 6 is a flowchart 600 representative of an example process that may be performed and/or implemented using hardware logic and/or example machine-readable instructions that may be executed by processor circuitry to implement the model output verification software application 102 of FIGS. 1, 2A, and/or 2B to assign a score to a verifiable statement in accordance with an evaluation of the verifiable statement. The flowchart 600 of FIG. 6 begins at block 602, at which the model output verification software application 102 may receive verifiable statement(s) and information source(s) to process. For example, the data interface module 210 may receive a paragraph of text, one or more text statements, and/or one or more phrases from one(s) of the electronic devices 106. In some such embodiments, the data interface module 210 may receive one or more information sources and/or identification(s) thereof from the electronic devices 106.

At block 604, the model output verification software application 102 may select a verifiable statement to process. For example, the parsing module 220 may parse the received text into one or more individual verifiable statements. In some embodiments, the statement selection module 231 may select one of the individual verifiable statements for veracity attestation.

At block 606, the model output verification software application 102 may search the information source(s) for the selected verifiable statement looking for an exact or near exact match. For example, the search module 232 may search the information source(s), which may correspond to one(s) of the information repositories 114, 116 of FIG. 1, using one or more search queries.

At block 608, the model output verification software application 102 may determine whether an exact match, a near match, or neither is identified based at least in part on the search. For example, the search module 232 may determine that an exact match or a near exact match of the selected verifiable statement is identified in the search results. In some embodiments, the search module 232 may determine that neither an exact nor a near exact match is identified based on the search results.

If, at block 608, the model output verification software application 102 determines that a near match is identified based at least in part on the search, control proceeds to block 610. At block 610, the model output verification software application 102 may execute a model trained for natural language comprehension to determine whether the near match has the same meaning. For example, the statement comprehension module 236 may execute a model (e.g., a trained ML model, an NLP model) trained for natural language comprehension to determine whether the search results representative of a near match have the same meaning (e.g., contextual meaning, lexical meaning, semantic meaning) as the selected verifiable statement.

At block 614, the model output verification software application 102 may determine whether the near match has the same meaning as the selected verifiable statement. For example, the statement comprehension module 236 may determine that information conveyed by the search results have the same meaning as the selected verifiable statement.

If, at block 614, the model output verification software application 102 determines that the near match has the same meaning as the selected verifiable statement, control proceeds to block 616. At block 616, the model output verification software application 102 may assign a score to the selected verifiable statement corresponding to a near exact match. For example, the verification score module 234 may assign a score to the selected verifiable statement indicative that the selected verifiable statement is substantively verified. For example, the assigned score may be less than a score assigned to an exact match and greater than a score assigned to neither an exact match nor a near match. After assigning the score at block 616, control proceeds to block 622.

If, at block 614, the model output verification software application 102 determines that the near match does not have the same meaning as the selected verifiable statement, control proceeds to block 618. At block 618, the model output verification software application 102 may execute a model to evaluate the veracity of the verifiable statement based on the information source(s). For example, the search module 232 may retrieve information from the information source(s) and provide the retrieved information to the statement comprehension module 236. In some such embodiments, the statement comprehension module 236 may execute a model (e.g., a trained ML model, an NLP model) trained for natural language comprehension to determine, based on its own comprehension and/or evaluation rather than returned search results (e.g., search engine search results, Internet search results), whether the information source(s) contain information having the same meaning as the selected verifiable statement.

After executing the model at block 618, control proceeds to block 620. At block 620, the model output verification software application 102 may assign a score in accordance with the evaluation to the selected verifiable statement. For example, the verification score module 234 may assign a score to the selected verifiable statement indicative that the selected verifiable statement is substantively verified. For example, the assigned score may be less than a score assigned to an exact match and greater than a score assigned to neither an exact match nor a near match. In some embodiments, the assigned score may be less than a score assigned to a near match as determined based on the search results. After assigning the score at block 620, control proceeds to block 622.

If, at block 608, the model output verification software application 102 determines that neither an exact match nor a near match is identified based at least in part on the search, control proceeds to block 618. For example, the search module 232 may retrieve information from the information source(s) and provide the retrieved information to the statement comprehension module 236. In some such embodiments, the statement comprehension module 236 may execute a model (e.g., a trained ML model, an NLP model) trained for natural language comprehension to determine, based on its own comprehension and/or evaluation rather than returned search results (e.g., search engine search results, Internet search results), whether the information source(s) contain information having the same meaning as the selected verifiable statement.

If, at block 608, the model output verification software application 102 determines that an exact match is identified based at least in part on the search, control proceeds to block 612. At block 612, the model output verification software application 102 may assign a score to the selected verifiable statement corresponding to an exact match. For example, the verification score module 234 may assign a score to the selected verifiable statement indicative that the selected verifiable statement is completely, entirely, and/or unequivocally verified. In some such embodiments, the assigned score may be the highest score in a range of scores to be assigned to a verifiable aspect such as a verifiable statement. After assigning the score at block 612, control proceeds to block 622.

At block 622, the model output verification software application 102 may determine whether to select another verifiable statement to process. For example, the statement selection module 231 may select another one of the individual verifiable statements for veracity attestation. If, at block 622, the model output verification software application 102 determines to select another verifiable statement to process, control returns to block 604. Otherwise, the flowchart 600 of FIG. 6 concludes.

FIG. 7 is an example implementation of an electronic platform 700 structured to execute the machine-readable instructions of FIGS. 3, 4, 5, and/or 6 to implement the model output verification software application 102 of FIGS. 1, 2A, and/or 2B. It should be appreciated that FIG. 7 is intended neither to be a description of necessary components for an electronic and/or computing device to operate as the model output verification software application 102, in accordance with the techniques described herein, nor a comprehensive depiction. The electronic platform 700 of this example may be an electronic device, such as a cellular network device (e.g., a smartphone), a desktop computer, a laptop computer, a tablet computer, a server (e.g., a computer server, a blade server, a rack-mounted server, etc.), a wearable device (e.g., a headset, an augmented reality and/or virtual reality (AR/VR) headset, a smartwatch), an Internet-of-Things (IoT) device, a workstation, or any other type of computing and/or electronic device.

The electronic platform 700 of the illustrated example includes processor circuitry 702, which may be implemented by one or more programmable processors, one or more hardware-implemented state machines, one or more ASICs, etc., and/or any combination(s) thereof. For example, the one or more programmable processors may include one or more CPUs, one or more DSPs, one or more FPGAs, one or more neuromorphic processors, one or more quantum processors, etc., and/or any combination(s) thereof. The processor circuitry 702 includes processor memory 704, which may be volatile memory, such as random-access memory (RAM) of any type. The processor circuitry 702 of this example implements the parsing module 220, the veracity evaluation module 230, the unverified aspect processing module 240, the results presentation module 260, and the graphical user interface module 270 of FIGS. 2A and/or 2B.

The processor circuitry 702 may execute machine-readable instructions 706 (identified by INSTRUCTIONS), which are stored in the processor memory 704, to implement at least one of the parsing module 220, the veracity evaluation module 230, the unverified aspect processing module 240, the results presentation module 260, and the graphical user interface module 270 of FIGS. 2A and/or 2B. The machine-readable instructions 706 may include data representative of computer-executable and/or machine-executable instructions implementing techniques that operate according to the techniques described herein. For example, the machine-readable instructions 706 may include data (e.g., code, embedded software (e.g., firmware), software, etc.) representative of the flowcharts of FIGS. 3, 4, 5, and/or 6, or portion(s) thereof.

The electronic platform 700 includes memory 708, which may include the instructions 706. The memory 708 of this example may be controlled by a memory controller 710. For example, the memory controller 710 may control reads, writes, and/or, more generally, access(es) to the memory 708 by other component(s) of the electronic platform 700. The memory 708 of this example may be implemented by volatile memory, non-volatile memory, etc., and/or any combination(s) thereof. For example, the volatile memory may include static random-access memory (SRAM), dynamic random-access memory (DRAM), cache memory (e.g., Level 1 (L1) cache memory, Level 2 (L2) cache memory, Level 3 (L3) cache memory, etc.), etc., and/or any combination(s) thereof. In some examples, the non-volatile memory may include Flash memory, electrically erasable programmable read-only memory (EEPROM), magnetoresistive random-access memory (MRAM), ferroelectric random-access memory (FeRAM, F-RAM, or FRAM), etc., and/or any combination(s) thereof.

The electronic platform 700 includes input device(s) 712 to enable data and/or commands to be entered into the processor circuitry 702. For example, the input device(s) 712 may include an audio sensor, a camera (e.g., a still camera, a video camera, etc.), a keyboard, a microphone, a mouse, a touchscreen, a voice recognition system, etc., and/or any combination(s) thereof.

The electronic platform 700 includes output device(s) 714 to convey, display, and/or present information to a user (e.g., a human user, a machine user, etc.). For example, the output device(s) 714 may include one or more display devices, speakers, etc. The one or more display devices may include an augmented reality (AR) and/or virtual reality (VR) display, a liquid crystal display (LCD), a light-emitting diode (LED) display, an organic light-emitting diode (OLED) display, a quantum dot (QLED) display, a thin-film transistor (TFT) LCD, a touchscreen, etc., and/or any combination(s) thereof. The output device(s) 714 can be used, among other things, to generate, launch, and/or present a user interface. For example, the user interface may be generated and/or implemented by the output device(s) 714 for visual presentation of output and speakers or other sound generating devices for audible presentation of output.

The electronic platform 700 includes accelerators 716, which are hardware devices to which the processor circuitry 702 may offload compute tasks to accelerate their processing. For example, the accelerators 716 may include artificial intelligence/machine learning (AI/ML) processors, ASICs, FPGAs, graphics processing units (GPUs), neural network (NN) processors, systems-on-chip (SoCs), vision processing units (VPUs), etc., and/or any combination(s) thereof. In some examples, one or more of the parsing module 220, the veracity evaluation module 230, the unverified aspect processing module 240, the results presentation module 260, and/or the graphical user interface module 270 may be implemented by one(s) of the accelerators 716 instead of the processor circuitry 702. In some examples, the parsing module 220, the veracity evaluation module 230, the unverified aspect processing module 240, the results presentation module 260, and/or the graphical user interface module 270 may be executed concurrently (e.g., in parallel, substantially in parallel, etc.) by the processor circuitry 702 and the accelerators 716. For example, the processor circuitry 702 and one(s) of the accelerators 716 may execute in parallel function(s) corresponding to the veracity evaluation module 230.

The electronic platform 700 includes storage 718 to record and/or control access to data, such as the machine-readable instructions 706. In this example, the storage 718 implements the results datastore 250, which stores at least the aspect evaluation(s) 229. The storage 718 may be implemented by one or more mass storage disks or devices, such as HDDs, SSDs, etc., and/or any combination(s) thereof.

The electronic platform 700 includes interface(s) 720 to effectuate exchange of data with external devices (e.g., computing and/or electronic devices of any kind) via a network 722. In this example, the interface(s) 720 implement the data interface module 210 and the network module 233 of FIG. 2B. The interface(s) 720 of the illustrated example may be implemented by an interface device, such as network interface circuitry (e.g., a NIC, a smart NIC, etc.), a gateway, a router, a switch, etc., and/or any combination(s) thereof. The interface(s) 720 may implement any type of communication interface, such as BLUETOOTH®, a cellular telephone system (e.g., a 4G LTE interface, a 5G interface, a future generation 6G interface, etc.), an Ethernet interface, a near-field communication (NFC) interface, an optical disc interface (e.g., a Blu-ray disc drive, a Compact Disk (CD) drive, a Digital Versatile Disk (DVD) drive, etc.), an optical fiber interface, a satellite interface (e.g., a BLOS satellite interface, a LOS satellite interface, etc.), a Universal Serial Bus (USB) interface (e.g., USB Type-A, USB Type-B, USB TYPE-C™ or USB-C™, etc.), etc., and/or any combination(s) thereof.

The electronic platform 700 includes a power supply 724 to store energy and provide power to components of the electronic platform 700. The power supply 724 may be implemented by a power converter, such as an alternating current-to-direct-current (AC/DC) power converter, a direct current-to-direct current (DC/DC) power converter, etc., and/or any combination(s) thereof. For example, the power supply 724 may be powered by an external power source, such as an alternating current (AC) power source (e.g., an electrical grid), a direct current (DC) power source (e.g., a battery, a battery backup system, etc.), etc., and the power supply 724 may convert the AC input or the DC input into a suitable voltage for use by the electronic platform 700. In some examples, the power supply 724 may be a limited duration power source, such as a battery (e.g., a rechargeable battery such as a lithium-ion battery).

Component(s) of the electronic platform 700 may be in communication with one(s) of each other via a bus 726. For example, the bus 726 may be any type of computing and/or electrical bus, such as an I2C bus, a PCI bus, a PCIe bus, a SPI bus, and/or the like.

The network 722 may be implemented by any wired and/or wireless network(s) such as one or more cellular networks (e.g., 4G LTE cellular networks, 5G cellular networks, future generation 6G cellular networks, etc.), one or more data buses, one or more local area networks (LANs), one or more optical fiber networks, one or more private networks (e.g., one or more closed networks), one or more public networks, one or more wireless local area networks (WLANs), etc., and/or any combination(s) thereof. For example, the network 722 may be the Internet, but any other type of private and/or public network is contemplated.

The network 722 of the illustrated example facilitates communication between the interface(s) 720 and a central facility 728. The central facility 728 in this example may be an entity associated with one or more servers, such as one or more physical hardware servers and/or virtualizations of the one or more physical hardware servers. For example, the central facility 728 may be implemented by a public cloud provider, a private cloud provider, etc., and/or any combination(s) thereof. In this example, the central facility 728 may compile, generate, update, etc., the machine-readable instructions 706 and store the machine-readable instructions 706 for access (e.g., download) via the network 722. For example, the electronic platform 700 may transmit a request, via the interface(s) 720, to the central facility 728 for the machine-readable instructions 706 and receive the machine-readable instructions 706 from the central facility 728 via the network 722 in response to the request.

Additionally or alternatively, the interface(s) 720 may receive the machine-readable instructions 706 via non-transitory machine-readable storage media, such as an optical disc 730 (e.g., a Blu-ray disc, a CD, a DVD, etc.) or any other type of removable non-transitory machine-readable storage media such as a USB drive 732. For example, the optical disc 730 and/or the USB drive 732 may store the machine-readable instructions 706 thereon and provide the machine-readable instructions 706 to the electronic platform 700 via the interface(s) 720.

Techniques operating according to the principles described herein may be implemented in any suitable manner. The processing and decision blocks of the flowcharts above represent steps and acts that may be included in algorithms that carry out these various processes. Algorithms derived from these processes may be implemented as software integrated with and directing the operation of one or more single- or multi-purpose processors, may be implemented as functionally equivalent circuits such as a DSP circuit or an ASIC, or may be implemented in any other suitable manner. It should be appreciated that the flowcharts included herein do not depict the syntax or operation of any particular circuit or of any particular programming language or type of programming language. Rather, the flowcharts illustrate the functional information one skilled in the art may use to fabricate circuits or to implement computer software algorithms to perform the processing of a particular apparatus carrying out the types of techniques described herein. For example, the flowcharts, or portion(s) thereof, may be implemented by hardware alone (e.g., one or more analog or digital circuits, one or more hardware-implemented state machines, etc., and/or any combination(s) thereof) that is configured or structured to carry out the various processes of the flowcharts. In some examples, the flowcharts, or portion(s) thereof, may be implemented by machine-executable instructions (e.g., machine-readable instructions, computer-readable instructions, computer-executable instructions, etc.) that, when executed by one or more single- or multi-purpose processors, carry out the various processes of the flowcharts. It should also be appreciated that, unless otherwise indicated herein, the particular sequence of steps and/or acts described in each flowchart is merely illustrative of the algorithms that may be implemented and can be varied in implementations and embodiments of the principles described herein.

Accordingly, in some embodiments, the techniques described herein may be embodied in machine-executable instructions implemented as software, including as application software, system software, firmware, middleware, embedded code, or any other suitable type of computer code. Such machine-executable instructions may be generated, written, etc., using any of a number of suitable programming languages and/or programming or scripting tools, and also may be compiled as executable machine language code or intermediate code that is executed on a framework, virtual machine, or container.

When techniques described herein are embodied as machine-executable instructions, these machine-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc., that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement using the exemplary techniques described herein, and that embodiments are not limited to being implemented in any specific number, division, or type of functional facilities. In some implementations, all functionalities may be implemented in a single functional facility. It should also be appreciated that, in some implementations, some of the functional facilities described herein may be implemented together with or separately from others (e.g., as a single unit or separate units), or some of these functional facilities may not be implemented.

Machine-executable instructions implementing the techniques described herein (when implemented as one or more functional facilities or in any other manner) may, in some embodiments, be encoded on one or more computer-readable media, machine-readable media, etc., to provide functionality to the media. Computer-readable media include magnetic media such as a hard disk drive, optical media such as a CD or a DVD, a persistent or non-persistent solid-state memory (e.g., Flash memory, Magnetic RAM, etc.), or any other suitable storage media. Such a computer-readable medium may be implemented in any suitable manner. As used herein, the terms "computer-readable media" (also called "computer-readable storage media") and "machine-readable media" (also called "machine-readable storage media") refer to tangible storage media. Tangible storage media are non-transitory and have at least one physical, structural component. In a "computer-readable medium" and "machine-readable medium" as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium, a machine-readable medium, etc., may be altered during a recording process.

Further, some techniques described above comprise acts of storing information (e.g., data and/or instructions) in certain ways for use by these techniques. In some implementations of these techniques—such as implementations where the techniques are implemented as machine-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as machine-executable instructions, these instructions may be executed on one or more suitable computing device(s) and/or electronic device(s)

operating in any suitable computer and/or electronic system, or one or more computing devices (or one or more processors of one or more computing devices) and/or one or more electronic devices (or one or more processors of one or more electronic devices) may be programmed to execute the machine-executable instructions. A computing device, electronic device, or processor (e.g., processor circuitry) may be programmed to execute instructions when the instructions are stored in a manner accessible to the computing device, electronic device, or processor, such as in a data store (e.g., an on-chip cache or instruction register, a computer-readable storage medium and/or a machine-readable storage medium accessible via a bus, a computer-readable storage medium and/or a machine-readable storage medium accessible via one or more networks and accessible by the device/processor, etc.). Functional facilities comprising these machine-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more FPGAs for carrying out the techniques described herein, or any other suitable system.

Embodiments have been described where the techniques are implemented in circuitry and/or machine-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The phrase "and/or," as used herein in the specification and in the claims, should be understood to mean "either or both," of the elements so conjoined, e.g., elements that are conjunctively present in some cases and disjunctively present in other cases. Multiple elements listed with "and/or" should be construed in the same fashion, e.g., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The indefinite articles "a" and "an," as used herein in the specification and in the claims, unless clearly indicated to the contrary, should be understood to mean "at least one."

As used herein in the specification and in the claims, the phrase, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

All definitions, as defined and used herein, should be understood to control over dictionary definitions, definitions in documents incorporated by reference, and/or ordinary meanings of the defined terms.

The word "exemplary" is used herein to mean serving as an example, instance, or illustration. Any embodiment, implementation, process, feature, etc., described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

Various aspects are described in this disclosure, which include, but are not limited to, the following aspects:

1. An apparatus for verifying information in an output produced by a first trained machine learning (ML) model in response to an input, the apparatus comprising: at least one memory to store computer-readable instructions; and at least one computer hardware processor to execute the computer-readable instructions to: (A) receive a first output generated by the first trained ML model in response to a first input, the first output comprising text; (B) parse the first output into one or more verifiable statements; (C) verify, using a second trained ML model and first reference data accessed from at least one first datastore via at least one first communication network, the one or more verifiable statements to produce first verification results, the first verification results indicating which of the one or more verifiable statements has been verified; (D) determine, based on the first verification results, whether any of the one or more verifiable statements remains unverified; (E) when it is determined that at least one of the one or more verifiable statements remains unverified, query the first trained ML model with a request to provide information identifying at least one second datastore having second reference data attesting to veracity of the first output; and verify, using the second trained ML model and the second reference data accessed from the at least one second datastore via the at least one first communication network or at least one second communication network, the at least one unverified statement to produce second verification results; and (F) provide output indicating whether one or more of the one or more verifiable statements have been verified based on at least one of the first verification results or the second verification results.

2. The apparatus of aspect 1, wherein the at least one computer hardware processor is to: process the first input using the first trained ML model to obtain the first output.

3. The apparatus of aspect 1, wherein the first trained ML model is a trained generative ML model, and the at least one computer hardware processor is to receive the first output generated by the trained generative ML model.

4. The apparatus of aspect 1, wherein the at least one computer hardware processor is to execute a model configured to identify constituent statements in text to parse the first output into one or more verifiable statements.

5. The apparatus of aspect 1, wherein the at least one computer hardware processor is to execute the second trained ML model to parse the first output into one or more verifiable statements.

6. The apparatus of aspect 1, wherein the first datastore and the second datastore are the same.

7. The apparatus of aspect 1, wherein the at least one computer hardware processor is to: determine that a first verifiable statement of the one or more verifiable statements substantially matches the first reference data; assign a verification score to the first verifiable statement in accordance with the first verifiable statement substantially matching the first reference data; and record, in at least one third datastore, one or more data associations of at least one of the first verifiable statement, the verification score, or an identification of a data source of at least a portion of the first reference data that substantially matches the first verifiable statement.

8. The apparatus of aspect 7, wherein at least one of the first datastore, the second datastore, or the third datastore are the same.

9. The apparatus of aspect 1, wherein the at least one computer hardware processor is to: determine that a first verifiable statement of the one or more verifiable statements at least partially matches the first reference data; execute the second trained ML model using the first verifiable statement and at least one portion of the first reference data as at least one second input to generate a third output representing that a first semantic meaning of the first verifiable statement corresponds to a second semantic meaning of the at least one portion of the first reference data; assign a verification score to the first verifiable statement in accordance with at least one of the at least partial matching or the correspondence of the first and second semantic meanings; and record, in at least one third datastore, one or more data associations of at least one of the first verifiable statement, the verification score, or an identification of a data source of the at least one portion of the first reference data.

10. The apparatus of aspect 1, wherein the at least one computer hardware processor is to: determine that a first verifiable statement of the one or more verifiable statements does not substantially match the first reference data; execute the second trained ML model using the first verifiable statement and at least one portion of the first reference data as at least one second input to generate a third output representing that the first verifiable statement is verified based on the at least one portion of the first reference data; assign a verification score to the first verifiable statement in accordance with at least one of the first verifiable statement not substantially matching the first reference data or the verification of the first verifiable statement based on the at least one portion of the first reference data; and record, in at least one third datastore, one or more data associations of at least one of the first verifiable statement, the verification score, or an identification of a data source of the at least one portion of the first reference data.

11. The apparatus of aspect 1, wherein the one or more verifiable statements comprise a first verifiable statement, and the at least one computer hardware processor is to: execute the second trained ML model using the first verifiable statement and the first reference data as at least one second input to generate a third output indicating that a first semantic meaning of the first verifiable statement does not correspond to one or more second semantic meanings associated with the first reference data; and identify the first verifiable statement as one of the at least one unverified statement based at least in part on the third output.

12. The apparatus of aspect 1, wherein the one or more verifiable statements comprise a first verifiable statement, and the at least one computer hardware processor is to: generate a related statement based on the first verifiable statement, the first verifiable statement having a first semantic meaning different than a second semantic meaning of the related statement; execute the second trained ML model using the related statement and the first reference data as at least one second input to generate a third output representing that the second semantic meaning of the related statement does not correspond to at least one of one or more third semantic meanings associated with the first reference data; and verify the first verifiable statement based at least in part on the second semantic meaning not corresponding to the at least one of the one or more third semantic meanings.

13. The apparatus of aspect 12, wherein the at least one computer hardware processor is to generate the related statement as a counterfactual statement.

14. The apparatus of aspect 12, wherein the at least one computer hardware processor is to generate the first semantic meaning to be opposite the second semantic meaning.

15. The apparatus of aspect 1, wherein the at least one computer hardware processor is to verify, with the second trained ML model, that the output is responsive to the input.

16. The apparatus of aspect 1, wherein the at least one computer hardware processor is to generate the output to comprise at least one of a citation to a data source of the output, a network link to the data source of the output, or a verification score associated with the data source of the output.

17. The apparatus of aspect 1, wherein the at least one computer hardware processor is to, after processing a plurality of outputs by the first trained ML model, assign a reliability score indicative of a degree to which the first trained ML model is likely to output verified statements.

18. The apparatus of aspect 1, wherein the at least one computer hardware processor is a neuromorphic hardware processor.

19. At least one non-transitory computer-readable storage medium comprising instructions that, when executed by at least one computer hardware processor, cause the at least one computer hardware processor to perform a method for verifying information in an output produced by a first trained machine learning (ML) model in response to an input, the method comprising: (A) receiving a first output generated by the first trained ML model in response to a first input, the first output comprising text; (B) parsing the first output into one or more verifiable statements; (C) verifying, using a second trained ML model and first reference data accessed from at least one first datastore via at least one first communication network, the one or more verifiable statements to produce first verification results, the first verification results indicating which of the one or more verifiable statements has been verified; (D) determining, based on the first verification results, whether any of the one or more verifiable statements remains unverified; (E) when it is determined that at least one of the one or more verifiable statements remains unverified, querying the first trained ML model with a request to provide information identifying at least one second datastore having second reference data attesting to veracity of the first output; and verifying, using the second trained ML model and the second reference data accessed from the at least one second datastore via the at least one first communication network or at least one second communication network, the at least one unverified statement to produce second verification results; and (F) providing output indicating whether one or more of the one or more verifiable statements have been verified based on at least one of the first verification results or the second verification results.

20. The at least one non-transitory computer-readable storage medium of aspect 19, wherein the instructions cause the at least one computer hardware processor to: process the first input using the first trained ML model to obtain the first output.

21. The at least one non-transitory computer-readable storage medium of aspect 19, wherein the first trained ML model is a trained generative ML model, and the instructions cause the at least one computer hardware processor to receive the first output generated by the trained generative ML model.

22. The at least one non-transitory computer-readable storage medium of aspect 19, wherein the instructions cause the at least one computer hardware processor to execute a model configured to identify constituent statements in text to parse the first output into one or more verifiable statements.

23. The at least one non-transitory computer-readable storage medium of aspect 19, wherein the instructions cause the at least one computer hardware processor to execute the second trained ML model to parse the first output into one or more verifiable statements.

24. The at least one non-transitory computer-readable storage medium of aspect 19, wherein the first datastore and the second datastore are the same.

25. The at least one non-transitory computer-readable storage medium of aspect 19, wherein the instructions cause the at least one computer hardware processor to: determine that a first verifiable statement of the one or more verifiable statements substantially matches the first reference data; assign a verification score to the first verifiable statement in accordance with the first verifiable statement substantially matching the first reference data; and record, in at least one third datastore, one or more data associations of at least one of the first verifiable statement, the verification score, or an identification of a data source of at least a portion of the first reference data that substantially matches the first verifiable statement.

26. The at least one non-transitory computer-readable storage medium of aspect 25, wherein at least one of the first datastore, the second datastore, or the third datastore are the same.

27. The at least one non-transitory computer-readable storage medium of aspect 19, wherein instructions cause the at least one computer hardware processor to: determine that a first verifiable statement of the one or more verifiable statements at least partially matches the first reference data; execute the second trained ML model using the first verifiable statement and at least one portion of the first reference data as at least one second input to generate a third output representing that a first semantic meaning of the first verifiable statement corresponds to a second semantic meaning of the at least one portion of the first reference data; assign a verification score to the first verifiable statement in accordance with at least one of the at least partial matching or the correspondence of the first and second semantic meanings; and record, in at least one third datastore, one or more data associations of at least one of the first verifiable statement, the verification score, or an identification of a data source of the at least one portion of the first reference data.

28. The at least one non-transitory computer-readable storage medium of aspect 19, wherein the instructions cause the at least one computer hardware processor to: determine that a first verifiable statement of the one or more verifiable statements does not substantially match the first reference data; execute the second trained ML model using the first verifiable statement and at least one portion of the first reference data as at least one second input to generate a third output representing that the first verifiable statement is verified based on the at least one portion of the first reference data; assign a verification score to the first verifiable statement in accordance with at least one of the first verifiable statement not substantially matching the first reference data or the verification of the first verifiable statement based on the at least one portion of the first reference data; and record, in at least one third datastore, one or more data associations of at least one of the first verifiable statement, the verification score, or an identification of a data source of the at least one portion of the first reference data.

29. The at least one non-transitory computer-readable storage medium of aspect 19, wherein the one or more verifiable statements comprise a first verifiable statement, and the at instructions cause the at least one computer hardware processor to: execute the second trained ML model using the first verifiable statement and the first reference data as at least one second input to generate a third output indicating that a first semantic meaning of the first verifiable statement does not correspond to one or more second semantic meanings associated with the first reference data; and identify the first verifiable statement as one of the at least one unverified statement based at least in part on the third output.

30. The at least one non-transitory computer-readable storage medium of aspect 19, wherein the one or more verifiable statements comprise a first verifiable statement, and the instructions cause the at least one computer hardware processor to: generate a related statement based on the first verifiable statement, the first verifiable statement having a first semantic meaning different than a second semantic meaning of the related statement; execute the second trained ML model using the related statement and the first reference data as at least one second input to generate a third output representing that the second semantic meaning of the related statement does not correspond to at least one of one or more third semantic meanings associated with the first reference data; and verify the first verifiable statement based at least in part on the second semantic meaning not corresponding to the at least one of the one or more third semantic meanings.

31. The at least one non-transitory computer-readable storage medium of aspect 30, wherein the instructions cause the at least one computer hardware processor to generate the related statement as a counterfactual statement.

32. The at least one non-transitory computer-readable storage medium of aspect 30, wherein the instructions cause the at least one computer hardware processor to generate the first semantic meaning to be opposite the second semantic meaning.

33. The at least one non-transitory computer-readable storage medium of aspect 19, wherein the instructions cause the at least one computer hardware processor to verify, with the second trained ML model, that the output is responsive to the input.

34. The at least one non-transitory computer-readable storage medium of aspect 19, wherein the instructions cause the at least one computer hardware processor to generate the output to comprise at least one of a citation to a data source of the output, a network link to the data source of the output, or a verification score associated with the data source of the output.

35. The at least one non-transitory computer-readable storage medium of aspect 19, wherein the instructions cause the at least one computer hardware processor to, after processing a plurality of outputs by the first trained ML model, assign a reliability score indicative of a degree to which the first trained ML model is likely to output verified statements.

36. The at least one non-transitory computer-readable storage medium of aspect 19, wherein the at least one computer hardware processor is a neuromorphic hardware processor, and the instructions are to be executed by the neuromorphic hardware processor.

37. A method for verifying information in an output produced by a first trained machine learning (ML) model in response to an input, the method comprising: using at least one computer hardware processor to perform: (A) receiving a first output generated by the first trained ML model in response to a first input, the first output comprising text; (B) parsing the first output into one or more verifiable statements; (C) verifying, using a second trained ML model and first reference data accessed from at least one first datastore via at least one first communication network, the one or more verifiable statements to produce first verification results, the first verification results indicating which of the one or more verifiable statements has been verified; (D) determining, based on the first verification results, whether any of the one or more verifiable statements remains unverified; (E) when it is determined that at least one of the one or more verifiable statements remains unverified, querying the first trained ML model with a request to provide information identifying at least one second datastore having second reference data attesting to veracity of the first output; and verifying, using the second trained ML model and the second reference data accessed from the at least one second datastore via the at least one first communication network or at least one second communication network, the at least one unverified statement to produce second verification results; and (F) providing output indicating whether one or more of the one or more verifiable statements have been verified based on at least one of the first verification results or the second verification results.

38. The method of aspect 37, further comprising: processing the first input using the first trained ML model to obtain the first output.

39. The method of aspect 37, wherein the first trained ML model is a trained generative ML model.

40. The method of aspect 37, wherein a model configured to identify constituent statements in text parses the first output into one or more verifiable statements.

41. The method of aspect 37, wherein the second trained ML model parses the first output into one or more verifiable statements.

42. The method of aspect 37, wherein the first datastore and the second datastore are the same.

43. The method of aspect 37, further comprising: determining that a first verifiable statement of the one or more verifiable statements substantially matches the first reference data; assigning a verification score to the first verifiable statement in accordance with the first verifiable statement substantially matching the first reference data; and recording, in at least one third datastore, one or more data associations of at least one of the first verifiable statement, the verification score, or an identification of a data source of at least a portion of the first reference data that substantially matches the first verifiable statement.

44. The method of aspect 43, wherein at least one of the first datastore, the second datastore, or the third datastore are the same.

45. The method of aspect 37, further comprising: determining that a first verifiable statement of the one or more verifiable statements at least partially matches the first reference data; executing the second trained ML model using the first verifiable statement and at least one portion of the first reference data as at least one second input to generate a third output representing that a first semantic meaning of the first verifiable statement corresponds to a second semantic meaning of the at least one portion of the first reference data; assigning a verification score to the first verifiable statement in accordance with at least one of the at least partial matching or the correspondence of the first and second semantic meanings; and recording, in at least one third datastore, one or more data associations of at least one of the first verifiable statement, the verification score, or an identification of a data source of the at least one portion of the first reference data.

46. The method of aspect 37, further comprising: determining that a first verifiable statement of the one or more verifiable statements does not substantially match the first reference data; executing the second trained ML model using the first verifiable statement and at least one portion of the first reference data as at least one second input to generate a third output representing that the first verifiable statement is verified based on the at least one portion of the first reference data; assigning a verification score to the first verifiable statement in accordance with at least one of the first verifiable statement not substantially matching the first reference data or the verification of the first verifiable statement based on the at least one portion of the first reference data; and recording, in at least one third datastore, one or more data associations of at least one of the first verifiable statement, the verification score, or an identification of a data source of the at least one portion of the first reference data.

47. The method of aspect 37, wherein the one or more verifiable statements comprise a first verifiable statement, and the method further comprising: executing the second trained ML model using the first verifiable statement and the first reference data as at least one second input to generate a third output indicating that a first semantic meaning of the first verifiable statement does not correspond to one or more second semantic meanings associated with the first reference data; and identifying the first verifiable statement as one of the at least one unverified statement based at least in part on the third output.

48. The method of aspect 37, wherein the one or more verifiable statements comprise a first verifiable statement, and the method further comprising: generating a related statement based on the first verifiable statement, the first verifiable statement having a first semantic meaning different than a second semantic meaning of the related statement; executing the second trained ML model using the related statement and the first reference data as at least one second input to generate a third output representing that the second semantic meaning of the related statement does not correspond to at least one of one or more third semantic meanings associated with the first reference data; and verifying the first verifiable statement based at least in part on the second semantic meaning not corresponding to the at least one of the one or more third semantic meanings.

49. The method of aspect 48, wherein the related statement is a counterfactual statement.

50. The method of aspect 48, wherein the first semantic meaning is opposite the second semantic meaning.

51. The method of aspect 37, further comprising verifying, with the second trained ML model, that the output is responsive to the input.

52. The method of aspect 37, wherein the output comprises at least one of a citation to a data source of the output, a network link to the data source of the output, or a verification score associated with the data source of the output.

53. The method of aspect 37, further comprising, after processing a plurality of outputs by the first trained ML model, assigning a reliability score indicative of a degree to which the first trained ML model is likely to output verified statements.

54. The method of aspect 37, wherein a neuromorphic computer comprises the at least one computer hardware processor.

55. A method for verifying information in an output produced by a first model in response to an input, the method comprising: using at least one computer hardware processor to perform: (A) receiving a first output generated by the first model in response to a first input, the first output comprising one or more verifiable statements in text; (B) verifying, using a second model and first reference data stored in at least one first datastore, the one or more verifiable statements to produce first verification results indicating which of the one or more verifiable statements has been verified; (C) when it is determined that at least one of the one or more verifiable statements remains unverified based on the first verification results, identifying, using at least one of the first model or the second model, at least one second datastore having second reference data attesting to veracity of the first output; and verifying, using the second model and the second reference data, the at least one unverified statement to produce second verification results; and (D) providing output indicating whether one or more of the one or more verifiable statements have been verified based on at least one of the first verification results or the second verification results.

56. The method of aspect 55, further comprising: processing the first input using the first model to obtain the first output.

57. The method of aspect 55, wherein the first model is a trained generative machine learning model.

58. The method of aspect 55, wherein a model configured to identify constituent statements in text parses the first output into one or more verifiable statements.

59. The method of aspect 55, wherein the second model parses the first output into one or more verifiable statements.

60. The method of aspect 55, wherein the first datastore and the second datastore are the same.

61. The method of aspect 55, further comprising: determining that a first verifiable statement of the one or more verifiable statements substantially matches the first reference data; assigning a verification score to the first verifiable statement in accordance with the first verifiable statement substantially matching the first reference data; and recording, in at least one third datastore, one or more data associations of at least one of the first verifiable statement, the verification score, or an identification of a data source of at least a portion of the first reference data that substantially matches the first verifiable statement.

62. The method of aspect 61, wherein at least one of the first datastore, the second datastore, or the third datastore are the same.

63. The method of aspect 55, further comprising: determining that a first verifiable statement of the one or more verifiable statements at least partially matches the first reference data; executing the second model using the first verifiable statement and at least one portion of the first reference data as at least one second input to generate a third output representing that a first semantic meaning of the first verifiable statement corresponds to a second semantic meaning of the at least one portion of the first reference data; assigning a verification score to the first verifiable statement in accordance with at least one of the at least partial matching or the correspondence of the first and second semantic meanings; and recording, in at least one third datastore, one or more data associations of at least one of the first verifiable statement, the verification score, or an identification of a data source of the at least one portion of the first reference data.

64. The method of aspect 55, further comprising: determining that a first verifiable statement of the one or more verifiable statements does not substantially match the first reference data; executing the second model using the first verifiable statement and at least one portion of the first reference data as at least one second input to generate a third output representing that the first verifiable statement is verified based on the at least one portion of the first reference data; assigning a verification score to the first verifiable statement in accordance with at least one of the first verifiable statement not substantially matching the first reference data or the verification of the first verifiable statement based on the at least one portion of the first reference data; and recording, in at least one third datastore, one or more data associations of at least one of the first verifiable statement, the verification score, or an identification of a data source of the at least one portion of the first reference data.

65. The method of aspect 55, wherein the one or more verifiable statements comprise a first verifiable statement, and the method further comprising: executing the second model using the first verifiable statement and the first reference data as at least one second input to generate a third output indicating that a first semantic meaning of the first verifiable statement does not correspond to one or more second semantic meanings associated with the first reference data; and identifying the first verifiable statement as one of the at least one unverified statement based at least in part on the third output.

66. The method of aspect 55, wherein the one or more verifiable statements comprise a first verifiable statement, and the method further comprising: generating a related statement based on the first verifiable statement, the first verifiable statement having a first semantic meaning different than a second semantic meaning of the related statement; executing the second model using the related statement and the first reference data as at least one second input to generate a third output representing that the second semantic meaning of the related statement does not correspond to at least one of one or more third semantic meanings associated with the first reference data; and verifying the first verifiable statement based at least in part on the second semantic meaning not corresponding to the at least one of the one or more third semantic meanings.

67. The method of aspect 66, wherein the related statement is a counterfactual statement.

68. The method of aspect 66, wherein the first semantic meaning is opposite the second semantic meaning.

69. The method of aspect 55, further comprising verifying, with the second model, that the output is responsive to the input.

70. The method of aspect 55, wherein the output comprises at least one of a citation to a data source of the output, a network link to the data source of the output, or a verification score associated with the data source of the output.

71. The method of aspect 55, further comprising, after processing a plurality of outputs by the first model, assigning a reliability score indicative of a degree to which the first model is likely to output verified statements.

72. The method of aspect 55, wherein a neuromorphic computer comprises the at least one computer hardware processor.

What is claimed is:

1. An apparatus for verifying information in an output produced by a first trained machine learning (ML) model in response to an input, the apparatus comprising:
   at least one memory to store computer-readable instructions; and
   at least one computer hardware processor to execute the computer-readable instructions to:
   (A) receive a first output generated by the first trained ML model in response to a first input, the first output comprising text;
   (B) parse the first output into one or more verifiable statements;
   (C) verify, using a second trained ML model and first reference data accessed from at least one first datastore via at least one first communication network, the one or more verifiable statements to produce first verification results, the first verification results indicating which of the one or more verifiable statements has been verified;
   (D) determine, based on the first verification results, whether any of the one or more verifiable statements remains unverified;
   (E) when it is determined that at least one of the one or more verifiable statements remains unverified, query the first trained ML model with a request to provide information identifying at least one second datastore having second reference data attesting to veracity of the first output; and
   verify, using the second trained ML model and the second reference data accessed from the at least one second datastore via the at least one first communication network or at least one second communication network, the at least one unverified statement to produce second verification results; and
   (F) provide output indicating whether one or more of the one or more verifiable statements have been verified based on at least one of the first verification results or the second verification results.

2. The apparatus of claim 1, wherein the at least one computer hardware processor is to:
   process the first input using the first trained ML model to obtain the first output.

3. The apparatus of claim 1, wherein the first trained ML model is a trained generative ML model, and the at least one computer hardware processor is to receive the first output generated by the trained generative ML model.

4. The apparatus of claim 1, wherein the at least one computer hardware processor is to execute a model configured to identify constituent statements in text to parse the first output into one or more verifiable statements.

5. The apparatus of claim 1, wherein the at least one computer hardware processor is to execute the second trained ML model to parse the first output into one or more verifiable statements.

6. The apparatus of claim 1, wherein the first datastore and the second datastore are the same.

7. The apparatus of claim 1, wherein the at least one computer hardware processor is to:
   determine that a first verifiable statement of the one or more verifiable statements substantially matches the first reference data;
   assign a verification score to the first verifiable statement in accordance with the first verifiable statement substantially matching the first reference data; and
   record, in at least one third datastore, one or more data associations of at least one of the first verifiable statement, the verification score, or an identification of a data source of at least a portion of the first reference data that substantially matches the first verifiable statement.

8. The apparatus of claim 7, wherein at least one of the first datastore, the second datastore, or the third datastore are the same.

9. The apparatus of claim 1, wherein the at least one computer hardware processor is to:
   determine that a first verifiable statement of the one or more verifiable statements at least partially matches the first reference data;
   execute the second trained ML model using the first verifiable statement and at least one portion of the first reference data as at least one second input to generate a third output representing that a first semantic meaning of the first verifiable statement corresponds to a second semantic meaning of the at least one portion of the first reference data;
   assign a verification score to the first verifiable statement in accordance with at least one of the at least partial matching or the correspondence of the first and second semantic meanings; and
   record, in at least one third datastore, one or more data associations of at least one of the first verifiable statement, the verification score, or an identification of a data source of the at least one portion of the first reference data.

10. The apparatus of claim 1, wherein the at least one computer hardware processor is to:
- determine that a first verifiable statement of the one or more verifiable statements does not substantially match the first reference data;
- execute the second trained ML model using the first verifiable statement and at least one portion of the first reference data as at least one second input to generate a third output representing that the first verifiable statement is verified based on the at least one portion of the first reference data;
- assign a verification score to the first verifiable statement in accordance with at least one of the first verifiable statement not substantially matching the first reference data or the verification of the first verifiable statement based on the at least one portion of the first reference data; and
- record, in at least one third datastore, one or more data associations of at least one of the first verifiable statement, the verification score, or an identification of a data source of the at least one portion of the first reference data.

11. The apparatus of claim 1, wherein the one or more verifiable statements comprise a first verifiable statement, and the at least one computer hardware processor is to:
- execute the second trained ML model using the first verifiable statement and the first reference data as at least one second input to generate a third output indicating that a first semantic meaning of the first verifiable statement does not correspond to one or more second semantic meanings associated with the first reference data; and
- identify the first verifiable statement as one of the at least one unverified statement based at least in part on the third output.

12. The apparatus of claim 1, wherein the one or more verifiable statements comprise a first verifiable statement, and the at least one computer hardware processor is to:
- generate a related statement based on the first verifiable statement, the first verifiable statement having a first semantic meaning different than a second semantic meaning of the related statement;
- execute the second trained ML model using the related statement and the first reference data as at least one second input to generate a third output representing that the second semantic meaning of the related statement does not correspond to at least one of one or more third semantic meanings associated with the first reference data; and
- verify the first verifiable statement based at least in part on the second semantic meaning not corresponding to the at least one of the one or more third semantic meanings.

13. The apparatus of claim 12, wherein the at least one computer hardware processor is to generate the related statement as a counterfactual statement.

14. The apparatus of claim 12, wherein the at least one computer hardware processor is to generate the first semantic meaning to be opposite the second semantic meaning.

15. The apparatus of claim 1, wherein the at least one computer hardware processor is to verify, with the second trained ML model, that the output is responsive to the input.

16. The apparatus of claim 1, wherein the at least one computer hardware processor is to generate the output to comprise at least one of a citation to a data source of the output, a network link to the data source of the output, or a verification score associated with the data source of the output.

17. The apparatus of claim 1, wherein the at least one computer hardware processor is to, after processing a plurality of outputs by the first trained ML model, assign a reliability score indicative of a degree to which the first trained ML model is likely to output verified statements.

18. The apparatus of claim 1, wherein the at least one computer hardware processor is a neuromorphic hardware processor.

19. At least one non-transitory computer-readable storage medium comprising instructions that, when executed by at least one computer hardware processor, cause the at least one computer hardware processor to perform a method for verifying information in an output produced by a first trained machine learning (ML) model in response to an input, the method comprising:
- (A) receiving a first output generated by the first trained ML model in response to a first input, the first output comprising text;
- (B) parsing the first output into one or more verifiable statements;
- (C) verifying, using a second trained ML model and first reference data accessed from at least one first datastore via at least one first communication network, the one or more verifiable statements to produce first verification results, the first verification results indicating which of the one or more verifiable statements has been verified;
- (D) determining, based on the first verification results, whether any of the one or more verifiable statements remains unverified;
- (E) when it is determined that at least one of the one or more verifiable statements remains unverified,
  - querying the first trained ML model with a request to provide information identifying at least one second datastore having second reference data attesting to veracity of the first output; and
  - verifying, using the second trained ML model and the second reference data accessed from the at least one second datastore via the at least one first communication network or at least one second communication network, the at least one unverified statement to produce second verification results; and
- (F) providing output indicating whether one or more of the one or more verifiable statements have been verified based on at least one of the first verification results or the second verification results.

20. The at least one non-transitory computer-readable storage medium of claim 19, wherein the instructions cause the at least one computer hardware processor to:
- determine that a first verifiable statement of the one or more verifiable statements substantially matches the first reference data;
- assign a verification score to the first verifiable statement in accordance with the first verifiable statement substantially matching the first reference data; and
- record, in at least one third datastore, one or more data associations of at least one of the first verifiable statement, the verification score, or an identification of a data source of at least a portion of the first reference data that substantially matches the first verifiable statement.

21. The at least one non-transitory computer-readable storage medium of claim 20, wherein at least one of the first datastore, the second datastore, or the third datastore are the same.

22. The at least one non-transitory computer-readable storage medium of claim 19, wherein instructions cause the at least one computer hardware processor to:

determine that a first verifiable statement of the one or more verifiable statements at least partially matches the first reference data;
execute the second trained ML model using the first verifiable statement and at least one portion of the first reference data as at least one second input to generate a third output representing that a first semantic meaning of the first verifiable statement corresponds to a second semantic meaning of the at least one portion of the first reference data;
assign a verification score to the first verifiable statement in accordance with at least one of the at least partial matching or the correspondence of the first and second semantic meanings; and
record, in at least one third datastore, one or more data associations of at least one of the first verifiable statement, the verification score, or an identification of a data source of the at least one portion of the first reference data.

23. The at least one non-transitory computer-readable storage medium of claim 19, wherein the instructions cause the at least one computer hardware processor to:
determine that a first verifiable statement of the one or more verifiable statements does not substantially match the first reference data;
execute the second trained ML model using the first verifiable statement and at least one portion of the first reference data as at least one second input to generate a third output representing that the first verifiable statement is verified based on the at least one portion of the first reference data;
assign a verification score to the first verifiable statement in accordance with at least one of the first verifiable statement not substantially matching the first reference data or the verification of the first verifiable statement based on the at least one portion of the first reference data; and
record, in at least one third datastore, one or more data associations of at least one of the first verifiable statement, the verification score, or an identification of a data source of the at least one portion of the first reference data.

24. The at least one non-transitory computer-readable storage medium of claim 19, wherein the one or more verifiable statements comprise a first verifiable statement, and the at instructions cause the at least one computer hardware processor to:
execute the second trained ML model using the first verifiable statement and the first reference data as at least one second input to generate a third output indicating that a first semantic meaning of the first verifiable statement does not correspond to one or more second semantic meanings associated with the first reference data; and
identify the first verifiable statement as one of the at least one unverified statement based at least in part on the third output.

25. The at least one non-transitory computer-readable storage medium of claim 19, wherein the one or more verifiable statements comprise a first verifiable statement, and the instructions cause the at least one computer hardware processor to:
generate a related statement based on the first verifiable statement, the first verifiable statement having a first semantic meaning different than a second semantic meaning of the related statement;
execute the second trained ML model using the related statement and the first reference data as at least one second input to generate a third output representing that the second semantic meaning of the related statement does not correspond to at least one of one or more third semantic meanings associated with the first reference data; and
verify the first verifiable statement based at least in part on the second semantic meaning not corresponding to the at least one of the one or more third semantic meanings.

26. The at least one non-transitory computer-readable storage medium of claim 25, wherein the instructions cause the at least one computer hardware processor to generate the related statement as a counterfactual statement.

27. The at least one non-transitory computer-readable storage medium of claim 25, wherein the instructions cause the at least one computer hardware processor to generate the first semantic meaning to be opposite the second semantic meaning.

28. The at least one non-transitory computer-readable storage medium of claim 19, wherein the instructions cause the at least one computer hardware processor to:
process the first input using the first trained ML model to obtain the first output.

29. The at least one non-transitory computer-readable storage medium of claim 19, wherein the first trained ML model is a trained generative ML model, and the instructions cause the at least one computer hardware processor to receive the first output generated by the trained generative ML model.

30. The at least one non-transitory computer-readable storage medium of claim 19, wherein the instructions cause the at least one computer hardware processor to execute a model configured to identify constituent statements in text to parse the first output into one or more verifiable statements.

31. The at least one non-transitory computer-readable storage medium of claim 19, wherein the instructions cause the at least one computer hardware processor to execute the second trained ML model to parse the first output into one or more verifiable statements.

32. The at least one non-transitory computer-readable storage medium of claim 19, wherein the first datastore and the second datastore are the same.

33. The at least one non-transitory computer-readable storage medium of claim 19, wherein the instructions cause the at least one computer hardware processor to verify, with the second trained ML model, that the output is responsive to the input.

34. The at least one non-transitory computer-readable storage medium of claim 19, wherein the instructions cause the at least one computer hardware processor to generate the output to comprise at least one of a citation to a data source of the output, a network link to the data source of the output, or a verification score associated with the data source of the output.

35. The at least one non-transitory computer-readable storage medium of claim 19, wherein the instructions cause the at least one computer hardware processor to, after processing a plurality of outputs by the first trained ML model, assign a reliability score indicative of a degree to which the first trained ML model is likely to output verified statements.

36. The at least one non-transitory computer-readable storage medium of claim 19, wherein the at least one computer hardware processor is a neuromorphic hardware processor, and the instructions are to be executed by the neuromorphic hardware processor.

37. A method for verifying information in an output produced by a first trained machine learning (ML) model in response to an input, the method comprising:
  using at least one computer hardware processor to perform:
    (A) receiving a first output generated by the first trained ML model in response to a first input, the first output comprising text;
    (B) parsing the first output into one or more verifiable statements;
    (C) verifying, using a second trained ML model and first reference data accessed from at least one first datastore via at least one first communication network, the one or more verifiable statements to produce first verification results, the first verification results indicating which of the one or more verifiable statements has been verified;
    (D) determining, based on the first verification results, whether any of the one or more verifiable statements remains unverified;
    (E) when it is determined that at least one of the one or more verifiable statements remains unverified,
      querying the first trained ML model with a request to provide information identifying at least one second datastore having second reference data attesting to veracity of the first output; and
      verifying, using the second trained ML model and the second reference data accessed from the at least one second datastore via the at least one first communication network or at least one second communication network, the at least one unverified statement to produce second verification results; and
    (F) providing output indicating whether one or more of the one or more verifiable statements have been verified based on at least one of the first verification results or the second verification results.

38. The method of claim 37, wherein the one or more verifiable statements comprise a first verifiable statement, and the method further comprising:
  generating a related statement based on the first verifiable statement, the first verifiable statement having a first semantic meaning different than a second semantic meaning of the related statement;
  executing the second trained ML model using the related statement and the first reference data as at least one second input to generate a third output representing that the second semantic meaning of the related statement does not correspond to at least one of one or more third semantic meanings associated with the first reference data; and
  verifying the first verifiable statement based at least in part on the second semantic meaning not corresponding to the at least one of the one or more third semantic meanings.

39. The method of claim 38, wherein the related statement is a counterfactual statement.

40. The method of claim 38, wherein the first semantic meaning is opposite the second semantic meaning.

41. The method of claim 37, further comprising verifying, with the second trained ML model, that the output is responsive to the input.

42. The method of claim 37, wherein the output comprises at least one of a citation to a data source of the output, a network link to the data source of the output, or a verification score associated with the data source of the output.

43. The method of claim 37, further comprising, after processing a plurality of outputs by the first trained ML model, assigning a reliability score indicative of a degree to which the first trained ML model is likely to output verified statements.

44. The method of claim 37, further comprising:
  processing the first input using the first trained ML model to obtain the first output.

45. The method of claim 37, wherein the first trained ML model is a trained generative ML model.

46. The method of claim 37, wherein a model configured to identify constituent statements in text parses the first output into one or more verifiable statements.

47. The method of claim 37, wherein the second trained ML model parses the first output into one or more verifiable statements.

48. The method of claim 37, wherein the first datastore and the second datastore are the same.

49. The method of claim 37, further comprising:
  determining that a first verifiable statement of the one or more verifiable statements substantially matches the first reference data;
  assigning a verification score to the first verifiable statement in accordance with the first verifiable statement substantially matching the first reference data; and
  recording, in at least one third datastore, one or more data associations of at least one of the first verifiable statement, the verification score, or an identification of a data source of at least a portion of the first reference data that substantially matches the first verifiable statement.

50. The method of claim 49, wherein at least one of the first datastore, the second datastore, or the third datastore are the same.

51. The method of claim 37, further comprising:
  determining that a first verifiable statement of the one or more verifiable statements at least partially matches the first reference data;
  executing the second trained ML model using the first verifiable statement and at least one portion of the first reference data as at least one second input to generate a third output representing that a first semantic meaning of the first verifiable statement corresponds to a second semantic meaning of the at least one portion of the first reference data;
  assigning a verification score to the first verifiable statement in accordance with at least one of the at least partial matching or the correspondence of the first and second semantic meanings; and
  recording, in at least one third datastore, one or more data associations of at least one of the first verifiable statement, the verification score, or an identification of a data source of the at least one portion of the first reference data.

52. The method of claim 37, further comprising:
  determining that a first verifiable statement of the one or more verifiable statements does not substantially match the first reference data;
  executing the second trained ML model using the first verifiable statement and at least one portion of the first reference data as at least one second input to generate a third output representing that the first verifiable statement is verified based on the at least one portion of the first reference data;
  assigning a verification score to the first verifiable statement in accordance with at least one of the first verifiable statement not substantially matching the first reference data or the verification of the first verifiable statement based on the at least one portion of the first reference data; and recording, in at least one third datastore, one or more data associations of at least one of the first verifiable statement, the verification score, or an identification of a data source of the at least one portion of the first reference data.

53. The method of claim 37, wherein the one or more verifiable statements comprise a first verifiable statement, and the method further comprising:

executing the second trained ML model using the first verifiable statement and the first reference data as at least one second input to generate a third output indicating that a first semantic meaning of the first verifiable statement does not correspond to one or more second semantic meanings associated with the first reference data; and identifying the first verifiable statement as one of the at least one unverified statement based at least in part on the third output.

54. The method of claim 37, wherein a neuromorphic computer comprises the at least one computer hardware processor.

* * * * *